United States Patent
Bangalore Srinivas

(10) Patent No.: US 11,078,029 B1
(45) Date of Patent: Aug. 3, 2021

(54) APPARATUS FOR PROFILE RE-ORIENTATION FOR HANDLING

(71) Applicant: Tata Consultancy Services Limited, Mumbai (IN)

(72) Inventor: Venkatesh Prasad Bangalore Srinivas, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/084,330

(22) Filed: Oct. 29, 2020

(30) Foreign Application Priority Data

May 22, 2020 (IN) .............................. 202021021692

(51) Int. Cl.
| | | |
|---|---|---|
| *B65G 47/24* | (2006.01) | |
| *B65G 15/28* | (2006.01) | |
| *B65G 47/82* | (2006.01) | |
| *B65G 47/88* | (2006.01) | |
| *B65G 23/44* | (2006.01) | |
| *F16H 19/04* | (2006.01) | |
| *B65G 23/04* | (2006.01) | |

(52) U.S. Cl.
CPC ............. *B65G 47/24* (2013.01); *B65G 15/28* (2013.01); *B65G 47/82* (2013.01); *B65G 47/88* (2013.01); *B65G 23/04* (2013.01); *B65G 23/44* (2013.01); *F16H 19/04* (2013.01)

(58) Field of Classification Search
CPC ........ B65G 47/24; B65G 15/28; B65G 47/82; B65G 47/88; B65G 47/2445; B65G 47/252

USPC .......... 198/394, 397.06, 400, 402, 403, 407
See application file for complete search history.

(56) References Cited

U.S. PATENT DOCUMENTS

| | | | | |
|---|---|---|---|---|
| 2,630,204 A | * | 3/1953 | Lichtenberg | B65C 9/065 198/394 |
| 3,982,750 A | | 9/1976 | Pulda | |
| 4,687,244 A | | 8/1987 | Cullen et al. | |
| 4,740,025 A | * | 4/1988 | Nelson | B01L 9/50 294/902 |
| 5,125,495 A | * | 6/1992 | Ganzberger | B23Q 7/165 198/345.1 |
| 5,370,216 A | * | 12/1994 | Tsuruyama | G05B 19/4182 198/395 |

(Continued)

*Primary Examiner* — James R Bidwell
(74) *Attorney, Agent, or Firm* — Finnegan, Henderson, Farabow, Garrett & Dunner LLP

(57) ABSTRACT

Conventionally, in industries, different complex profiles (e.g., objects) are extruded and cut to required lengths for handling these profiles. This requires moving profiles from one location to another and placing them together with other similar or identical profiles which is currently a manual process. Present disclosure provides an apparatus for re-orientation of profiles for easy pick and place of these profiles from one location to another location. The apparatus includes actuator arm assemblies that are actuated for movement in upward and downward direction, wherein actuated rollers are trigged to move upward/downward directions accordingly. Profile is placed in initial position on an endless re-orienting belt above the surface of actuator arm assemblies wherein each actuator arm assembly is actuated to move the profile from one sub-region to another sub-region until the profile attains a desired orientation for pick and place of the re-oriented profile to desired location with required angle.

12 Claims, 18 Drawing Sheets

(56) References Cited

U.S. PATENT DOCUMENTS

| | | | | |
|---|---|---|---|---|
| 6,530,735 | B1* | 3/2003 | Trammell | B25J 15/00 |
| | | | | 198/750.11 |
| 6,540,472 | B2* | 4/2003 | Ewaschuk | B23Q 7/005 |
| | | | | 414/759 |
| 6,695,120 | B1 | 2/2004 | Trammell | |
| 8,893,877 | B2* | 11/2014 | Tan | B64F 1/366 |
| | | | | 198/463.6 |
| 9,808,936 | B2 | 11/2017 | Chavan Dafle et al. | |
| 2012/0305365 | A1* | 12/2012 | McCarry | B65G 47/24 |
| | | | | 198/373 |
| 2013/0220984 | A1* | 8/2013 | Cronin | B65G 47/24 |
| | | | | 219/121.82 |
| 2014/0224619 | A1* | 8/2014 | Takahashi | B65G 47/24 |
| | | | | 198/474.1 |

* cited by examiner

APPARATUS FOR PROFILE RE-ORIENTATION FOR HANDLING

PRIORITY CLAIM

This U.S. patent application claims priority under 35 U.S.C. § 119 to: India Application No. 202021021692, filed on May 22, 2020. The entire contents of the aforementioned application are incorporated herein by reference.

TECHNICAL FIELD

The disclosure herein generally relates to industry profile handling apparatuses, and, more particularly, to apparatus for profile re-orientation for handling.

BACKGROUND

In industries, such as manufacturing of materials, metals, and the like, various kinds of processes takes place such forming, joining, casting, machining, etc. Extrusion or continuous casting is one of the few processes generally used to form long profiles (or objects) of different cross-section. Extruded materials formed as a result of the extrusion vary in length and are handled either individually or collectively as group. Currently in the industries, handling of these profiles is manually done with involvement of a large number of laborers who pick and rotate objects to required position/orientation.

SUMMARY

Embodiments of the present disclosure present technological improvements as solutions to one or more of the above-mentioned technical problems recognized by the inventors in conventional systems. For example, in one aspect, there is provided an apparatus for re-orientation of one or more profiles and handling thereof. The apparatus comprises a mounting stand; at least one motor body that is fixed on the mounting stand, wherein the at least one motor body is configured to house one or more motors, wherein the at least one motor body comprises a plurality of slots, and wherein the plurality of slots are positioned adjacent to each other; a plurality of actuator arm assemblies, each of the plurality of actuator arm assemblies comprises: a first end and a second end; a rack holder, wherein the rack holder is positioned between the first end and the second end, wherein the rack holder is adapted to accommodate at least one rack gear, wherein each of the plurality of actuator arm assemblies is adapted to move in at least one of a first direction and a second direction based on a corresponding pinion gear coupled thereto, and being operated by a corresponding motor from the one or more motors, wherein each of the first end and the second end comprises a first flange and a second flange that (i) protrude outward from the first end and the second end and (ii) are separated by a distance forming a gap, wherein each of the first flange and the second flange comprise a hole, and wherein each of the plurality of actuator arm assemblies is (i) adapted to fit in a corresponding slot from the plurality of slots and (ii) positioned such that a rack gear of an actuator arm assembly from the plurality of actuator arm assemblies is diagonally opposite to another rack gear of another actuator arm assembly; and a plurality of actuated rollers, each of the plurality of actuated rollers comprise a first end and a second end, wherein each corresponding actuated roller from the plurality of actuated rollers is adapted to fit in the gap, wherein the first end and the second end of each of the plurality of actuated rollers are adapted to be fitted through the hole of the first flange and the second flange respectively; a first belt tensioner plate and a second belt tensioner plate, wherein each of the first belt tensioner plate and the second belt tensioner plate comprise a first surface and a second surface, wherein each of the first surface of each of the first belt tensioner plate and the second belt tensioner plate is coupled to a first side and a second side of the at least one motor body respectively; a third belt tensioner plate and a fourth belt tensioner plate having a first surface and a second surface, wherein the second surface of the third belt tensioner plate and the fourth belt tensioner plate is positioned opposite to the second surface of the first belt tensioner plate and the second belt tensioner plate respectively, wherein each of the third belt tensioner plate and the fourth belt tensioner plate comprises a plurality of holes on either side therebetween, wherein each of the first belt tensioner plate, the second belt tensioner plate, the third belt tensioner plate and the fourth belt tensioner plate comprise a first side and a second side, wherein each of the first side and the second side of the first belt tensioner plate, the second belt tensioner plate, the third belt tensioner plate and the fourth belt tensioner plate comprise one or more set of fingers, wherein a first finger of a finger set from the one or more finger set is positioned opposite to a second finger of the finger set to form a gap, each finger from the one or more set of fingers comprises a first end and a second end, and wherein the second end comprises a hole; a plurality of stepped rollers, each of the plurality of stepped rollers comprise a first end and a second end, wherein each corresponding stepped roller from the plurality of stepped rollers is adapted to fit in the gap formed by the first finger and the second finger of the first belt tensioner plate and the second belt tensioner plate such that the first end and the second end of each corresponding stepped roller passes through a corresponding hole of the first finger and the second finger; a plurality of dancing rollers, wherein each dancing roller from the plurality of dancing roller is adapted to be fitted in the gap of the first finger and the second finger of the third belt tensioner plate and the fourth belt tensioner plate such that a first end and a second end of each corresponding dancing roller passes through a corresponding hole of the first finger and the second finger; a plurality of guiding rods, wherein each guiding rod comprises a first end and second end, wherein the first end of a corresponding guiding rod from the plurality of guiding rods is fixed to the first side and the second side of the at least one motor body respectively, and wherein the second end of the corresponding guiding rod is coupled to a corresponding side of a corresponding guiding rod plate through a corresponding hole from the plurality of holes comprised on either side of each of the third belt tensioner plate and the fourth belt tensioner plate; and an endless re-orienting belt that is held by plurality of actuated rollers, the plurality of stepped rollers and the plurality of dancing rollers, wherein a profile is received on a region of the endless re-orienting belt that is above the plurality of actuator arm assemblies, in an initial orientation, and wherein each of the plurality of actuator arm assemblies move in the at least one of the first direction and the second direction based on the corresponding pinion gear coupled thereto, and is operated by the corresponding motor from the one or more motors such that the endless re-orienting belt moves until the profile attains a desired orientation.

The apparatus further comprises a groove on either side of, and along the length of the endless re-orienting belt.

The apparatus further comprises a first belt tensioner and a second belt tensioner coupled to the third belt tensioner plate and the fourth belt tensioner plate respectively, via a wire and a pulley mechanism, and wherein the first belt tensioner and the second belt tensioner are configured to adjust and balance tension of the endless re-orienting belt for movement of the endless re-orienting belt in at least one direction.

The apparatus further comprises a plurality of pins, wherein each of the plurality of pin is adaptively coupled to the first end and the second end of (i) each corresponding actuated roller from the plurality of actuated rollers, (ii) each corresponding sliding roller from the plurality of dancing rollers, and (iii) each corresponding stepped roller from the plurality of stepped rollers.

In an embodiment, when each of the plurality of actuated rollers moves in at least one direction, the third belt tensioner plate and the fourth belt tensioner plate are configured to (i) slide on the plurality of guiding rods and (ii) adjust the endless re-orienting belt to a desired tension.

In an embodiment, rotary motion of the corresponding pinion gear triggers a sliding motion for each of the plurality of actuator arm assemblies to move in the at least one of the first direction and the second direction.

In an embodiment, the endless re-orienting belt comprises: a center area; and a first step arrangement and a second step arrangement joining a corresponding side of the center area. Each of the first step arrangement and the second step arrangement comprise the groove.

The apparatus further comprises a plurality of bearing rollers. When the plurality of actuated rollers are actuated, each of the plurality of bearing rollers is configured to contact with the first step arrangement and the second step arrangement respectively to enable (i) an outer surface of the endless re-orienting belt to be in constant contact with each of the plurality of bearing rollers and (ii) a reduced friction between (a) each of the plurality of bearing rollers and (b) the first step arrangement and the second step arrangement of the endless re-orienting belt.

In an embodiment, each of the plurality of stepped rollers is in contact with an outer surface of the endless re-orienting belt. In an embodiment, each of the plurality of dancing rollers and each of the plurality of actuated rollers are in contact with an inner surface of the endless re-orienting belt.

In an embodiment, the profile is a non-circular object. In another embodiment, the profile comprises at least one flat surface. In an embodiment, the profile is a non-circular object having cross section same across the length of the profile.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
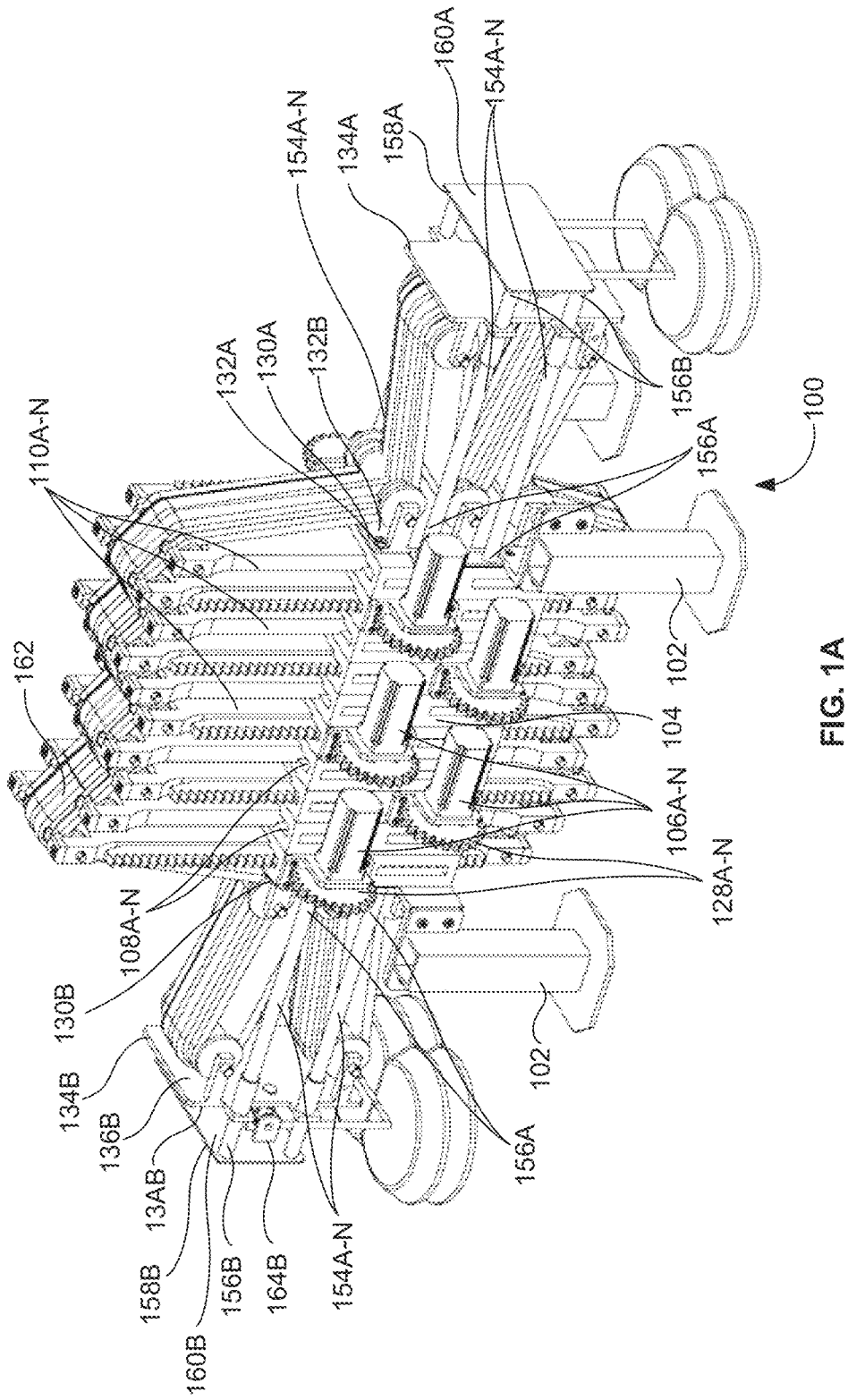
FIG. 1A depicts a perspective/isometric view of a profile re-orientation apparatus, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In industries, the different complex profiles (e.g., objects) are extruded and cut to required lengths. After cutting, the next task is to handle these profiles. This requires moving the profiles from one location to another location and placing them together with other similar or identical profiles. Before picking any profile, the profile must be in a desired orientation and many a times may not be in desired orientation. Thus, the profiles handling, and movement may be scattered across places in an undesired manner. Embodiments of the present disclosure provide an apparatus that enables re-orientation of profiles for easy pick and place of these profiles from one location to another location. More specifically, the apparatus of the present disclosure comprises a plurality of actuator arm assemblies that are actuated for movement in upward and downward direction, wherein actuated rollers are trigged to move upward and downward directions accordingly. The profile is placed in an initial position on an endless re-orienting belt above the surface of the actuator arm assemblies wherein each of the actuator arm assemblies are actuated to move the profile from one sub-region to another sub-region until the profile attains a desired orientation for pick and place of the re-oriented profile from one location to another location in a required angle.

Referring now to the drawings, and more particularly to FIG. 1 through 16, where similar reference characters denote corresponding features consistently throughout the figures, there are shown preferred embodiments and these embodiments are described in the context of the following exemplary system and/or method.

Reference numerals of one or more components of the gripper apparatus as depicted in the FIGS. 1A through 16 are provided in Table 1 below for ease of description:

TABLE 1

| SI. No | Component | Numeral reference |
|---|---|---|
| 1 | Profile re-orientation apparatus | 100 |
| 2 | Mounting stand | 102 |
| 3 | Motor body | 104 |
| 4 | One or more motors | 106A-N |
| 5 | Plurality of slots | 108A-N |
| 6 | Plurality of actuator arm assemblies | 110A-N |
| 7 | First end of actuator arm assembly | 112A |
| 8 | Second end of actuator arm assembly | 112B |
| 9 | Rack holder | 114 |
| 10 | First flange | 116A |
| 11 | Second flange | 116B |
| 12 | Gap | 118 |
| 13 | Holes | 120A-B |
| 14 | Rack gear | 122 |
| 15 | Plurality of actuated rollers | 124A-N |
| 16 | First end of actuated roller | 126A |
| 17 | Second end of actuated roller | 126B |
| 18 | Pinion gears | 128A-N |
| 19 | First belt tensioner plate | 130A |
| 20 | Second belt tensioner plate | 130B |
| 21 | First surface of the first belt tensioner plate and the second belt tensioner plate | 132A |
| 22 | Second surface of the first belt tensioner plate and the second belt tensioner plate | 132B |
| 23 | Third belt tensioner plate | 134A |
| 24 | Fourth belt tensioner plate | 134B |
| 25 | First surface of the third belt tensioner plate and the second belt tensioner plate | 136A |
| 26 | Second surface of the third belt tensioner plate and the second belt tensioner plate | 136B |
| 27 | Holes of third belt tensioner plate and the fourth belt tensioner plate | 138A-N |
| 27 | First side of the first belt tensioner plate, the second belt tensioner plate, the third belt tensioner plate and the fourth belt tensioner plate | 140A |
| 28 | Second side of the first belt tensioner plate, the second belt tensioner plate, the third belt tensioner plate and the fourth belt tensioner plate | 140B |
| 29 | one or more set of fingers set | 142A-N |
| 30 | Gaps | 144A-B |
| 31 | Plurality of stepped rollers | 146A-N |
| 32 | First end of stepped roller | 148A |
| 33 | Second end of stepped roller | 148B |
| 34 | Plurality of dancing rollers | 150A-N |
| 35 | First end of the dancing roller | 152A |
| 36 | Second end of the dancing roller | 152B |
| 37 | Plurality of guiding rods | 154A-N |

TABLE 1-continued

| SI. No | Component | Numeral reference |
|---|---|---|
| 38 | First end of guiding rod | 156A |
| 39 | Second end of guiding rod | 156B |
| 40 | First guiding rod plate | 158A |
| 41 | Second guiding rod plate | 158B |
| 42 | Outer surface of the guiding rod plate | 160A |
| 43 | Inner surface of the guiding rod plate | 160B |
| 44 | Endless re-orienting belt | 162 |
| 45 | First belt tensioner | 164A |
| 46 | Second belt tensioner | 164B |
| 47 | Wire | 166 |
| 48 | Pulley mechanism | 168 |
| 49 | Groove | 170 |
| 50 | Center area | 172 |
| 51 | A first step arrangement | 174A |
| 52 | A second step arrangement | 174B |
| 53 | A plurality of bearing rollers | 176A-N |
| 54 | Belt retainer | 178A-B |
| 55 | Belt locker/belt locker mechanism | 180 |

FIGS. 1A through 1D, depict a profile re-orientation apparatus (PRA) 100 for profile re-orientation for handling, in accordance with an embodiment of the present disclosure. More specifically, FIG. 1A depicts a perspective/isometric view of the profile re-orientation apparatus 100, in accordance with an embodiment of the present disclosure.

Figure 1B:
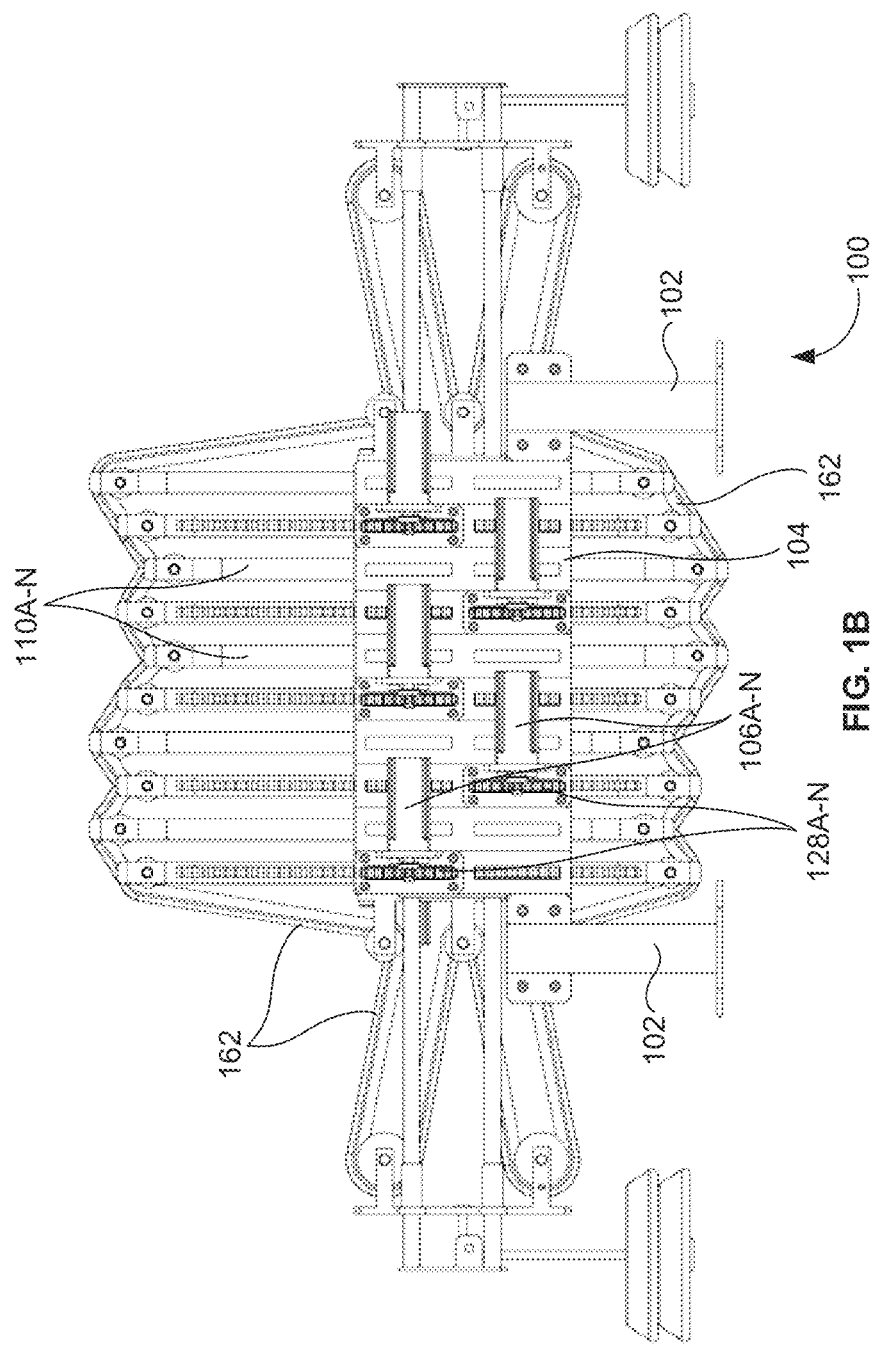
FIG. 1B depicts a front view of the profile re-orientation apparatus, in accordance with an embodiment of the present disclosure.
Figure 1C:
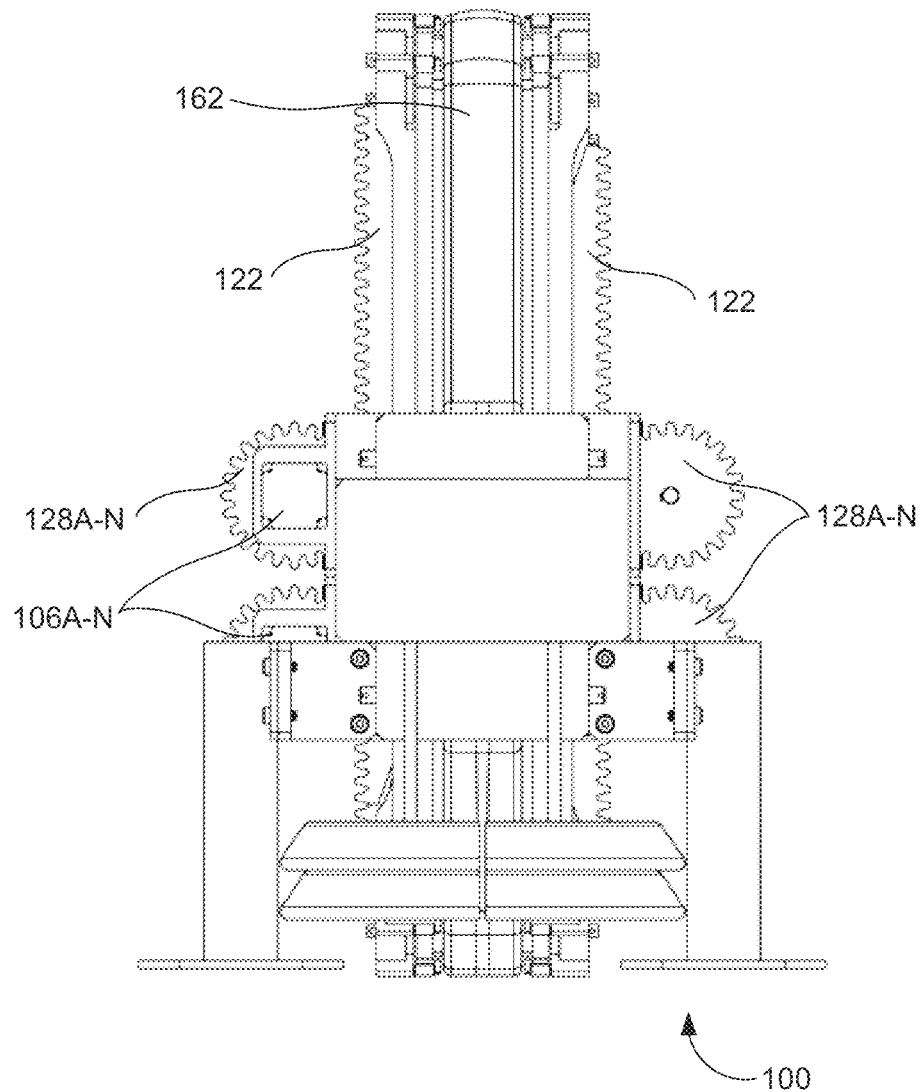
FIG. 1C depicts a side view of the profile re-orientation apparatus, in accordance with an embodiment of the present disclosure.
Figure 1D:
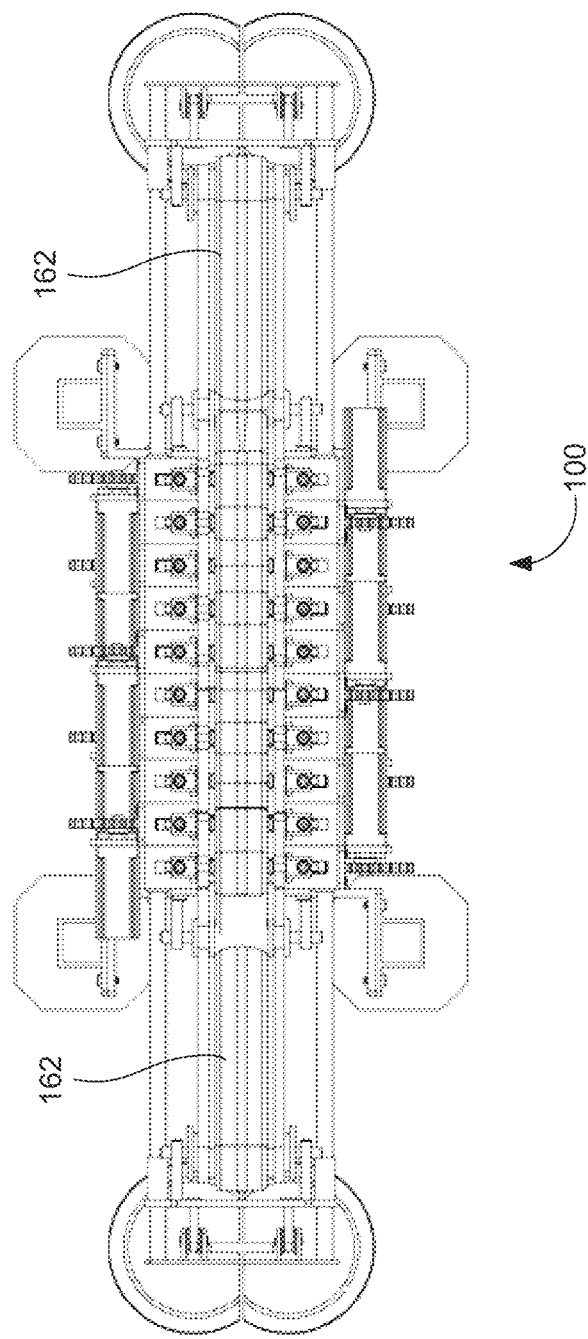
FIG. 1D depicts a top view of the profile re-orientation apparatus, in accordance with an embodiment of the present disclosure.
Figure 2:
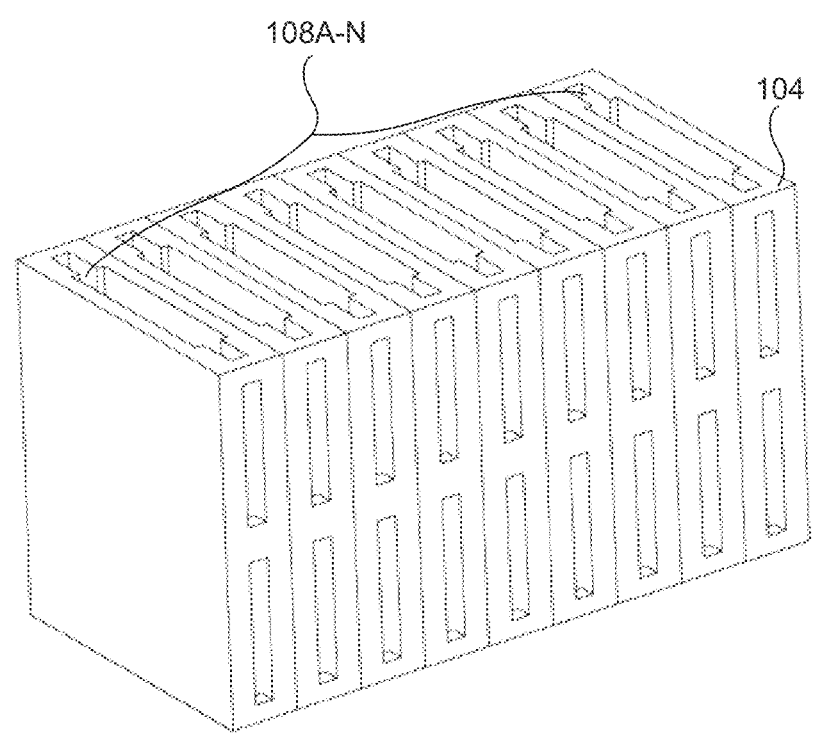
FIG. 2 depicts a perspective view of a motor body of the apparatus wherein the motor body comprises a plurality of slots, in accordance with an embodiment of the present disclosure.

FIG. 1B, with reference to FIG. 1A, depicts a front view of the profile re-orientation apparatus 100, in accordance with an embodiment of the present disclosure. FIG. 1C, with reference to FIG. 1A through 1B, depicts a side view of the profile re-orientation apparatus 100, in accordance with an embodiment of the present disclosure. FIG. 1D, with reference to FIGS. 1A through 1C, depicts a top view of the profile re-orientation apparatus 100, in accordance with an embodiment of the present disclosure. The profile re-orientation apparatus 100 may also be referred as 'an apparatus', 'a profile handling apparatus' and may be interchangeably used herein. The PRA 100 comprises a mounting stand 102, at least one motor body (also referred as 'motor body') 104 fixed on the mounting stand 102. The mounting stand 102 is adapted to accommodate/hold all components of the apparatus 100 described herein. The at least one motor body is configured to house one or more motors 106A-N. The one or more motors 106A-N are fixed on the surface of the motor body 104 via one or more fixation components, in one embodiment. In an embodiment, the one or more fixation components include, but are not limited to screws, nut and bolt mechanisms, fastener(s), pin(s), and the like. The one or more motors 106A-N may comprise one or more holes wherein the fixation components pass through theses holes and coupled to the motor body to hold the one or more motors 106A-N firmly and prevent from loose hanging and fall. As can be depicted from FIGS. 1A through 1D, the one or more motors 106A-N may be fixed on at least one side of the motor body 104 or on both sides of the motor body 104 depending upon the configuration/specification and the design of the apparatus 100. The at least one motor body 104 comprises a plurality of slots 108A-N. The plurality of slots 108A-N may also be referred as 'slots' and may be interchangeably used herein. The slots 108A-N are depicted in FIG. 2. More specifically, FIG. 2, with reference to FIGS. 1A through 1D, depicts a perspective view of the motor body 104 of the profile re-orientation apparatus 100 wherein the motor body 104 comprises the plurality of slots 108A-N, in accordance with an embodiment of the present disclosure.

Figure 3:
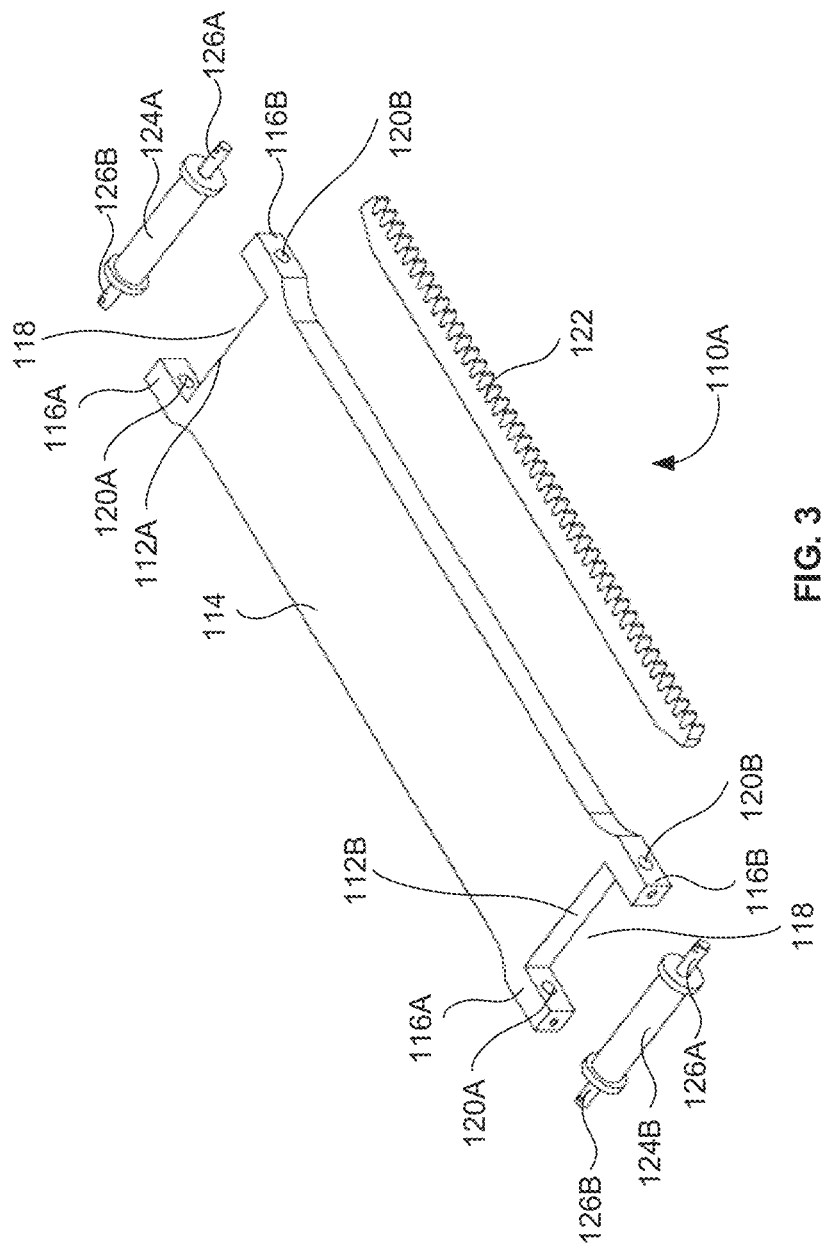
FIG. 3 depicts an actuator arm assembly comprised in the profile re-orientation apparatus of FIG. 1A through 1D, in accordance with an embodiment of the present disclosure.

As depicted in FIG. 2, the slots 108A-N are positioned adjacent to each other. Each of the slots 108A-N have a design configuration identical to another slot as shown in FIG. 2. Referring to FIGS. 1A through 1D, the apparatus 100 further comprises a plurality of actuator arm assemblies 110A-N. The plurality of actuator arm assemblies 110A-N may also be referred as actuator arm assemblies 110A-N and may be interchangeably used herein. FIG. 3, with reference to FIGS. 1A through 2, depicts an actuator arm assembly comprised in the apparatus 100, in accordance with an embodiment of the present disclosure. For the sake of brevity, the plurality of actuator arm assemblies 110A-N may collectively be referred as 110. More specifically, FIG. 3 depicts the actuator arm assembly 110A of FIG. 1A through 1D, in accordance with an embodiment of the present disclosure Each of the actuator arm assemblies 110A-N of FIGS. 1A through 1D, comprises a first end 112A, a second end 112B, and a rack holder 114. Each of the first end 112A and the second end 112B of the actuator arm assemblies 110A-N comprises a first flange 116A and a second flange 116B. The first flange 116A and the second flange 116B (i) protrude outward from the first end 112A and the second end 112B respectively and (ii) are separated by a distance forming a gap 118. Each of the first flange 116A and the second flange 116B comprise a corresponding hole (e.g., refer holes 120A and 120B). The rack holder 114 is positioned between the first end 112A and the second end 112B. The rack holder 114 is adapted to accommodate at least one rack gear 122.

Each of the plurality of actuator arm assemblies 110A-N is adapted to fit in a corresponding slot from the plurality of slots 108A-N. Each slot is a vertical slot. Each of the plurality of actuator arm assemblies 110A-N is vertically fitted in a corresponding slot. For instance, the actuator arm assembly 110A is adapted to be fitted into the slot 108A. Similarly, the actuator arm assemblies 110B, 110C, 110D, and 110N are adapted to be fitted into the slots 108B, 108C, 108D, and 108N respectively as depicted in FIGS. 1A through 1D. Further, each of the actuator arm assemblies may be positioned such that a rack gear of an actuator arm assembly from the plurality of actuator arm assemblies 110A-N is diagonally opposite to another rack gear of another actuator arm assembly as depicted in FIG. 1A, in one example embodiment. Each of the actuator arm assemblies 110A-N further comprises a plurality of actuated rollers 124A-B (also referred as 'pair of actuated rollers' or 'actuated rollers' 124A-B may be interchangeably used herein). Each of the plurality of actuated rollers 124A-B comprise a first end 126A and a second end 126B. Each corresponding actuated roller (e.g., say 124A) from the plurality of actuated rollers 124A-B is adapted to fit in the gap 118, respectively. The first end 126A and the second end 126B of each of the plurality of actuated rollers 124A-B are adapted to be fitted through the hole 120A-B of the first flange 116A and the second flange 116B, respectively.

Each of the plurality of actuator arm assemblies 110A-N of FIGS. 1A through 1D and FIG. 3 is adapted to move in at least one of a first direction (up or down) and a second direction (up or down) based on a corresponding pinion gear coupled thereto, and being operated by a corresponding motor from the one or more motors. Pinion gears 128A-N are depicted in FIG. 1A. In the present disclosure, if a pinion gear rotates clockwise then corresponding actuator arm assembly moves up and vice versa.

The apparatus 100 further comprises a first belt tensioner plate 130A and a second belt tensioner plate 130B as depicted in FIG. 1A. Each of the first belt tensioner plate 130A and the second belt tensioner plate 130B comprise a first surface 132A and a second surface 132B. Each of the first surface 132A of each of the first belt tensioner plate 130A and the second belt tensioner plate 120B is coupled to a first side and a second side of the at least one motor body 104, respectively. The apparatus 100 further comprises a third belt tensioner plate 134A and a fourth belt tensioner plate 134B having a first surface 136A and a second surface 136B. The second surface 136B of the third belt tensioner plate 134A and the fourth belt tensioner plate 134B is positioned opposite to the second surface 132A of the first belt tensioner plate 130A and the second belt tensioner plate 130B, respectively. Each of the third belt tensioner plate 134A and the fourth belt tensioner plate 134B comprises a plurality of holes 138A-N on either side therebetween. Bush(es) may be connected/coupled to each of the holes 138A-N as depicted in FIGS. It is to be understood that bushes may not be required and shall configuration of bushes shall not be construed as limiting the scope of the present disclosure.

Figure 4:
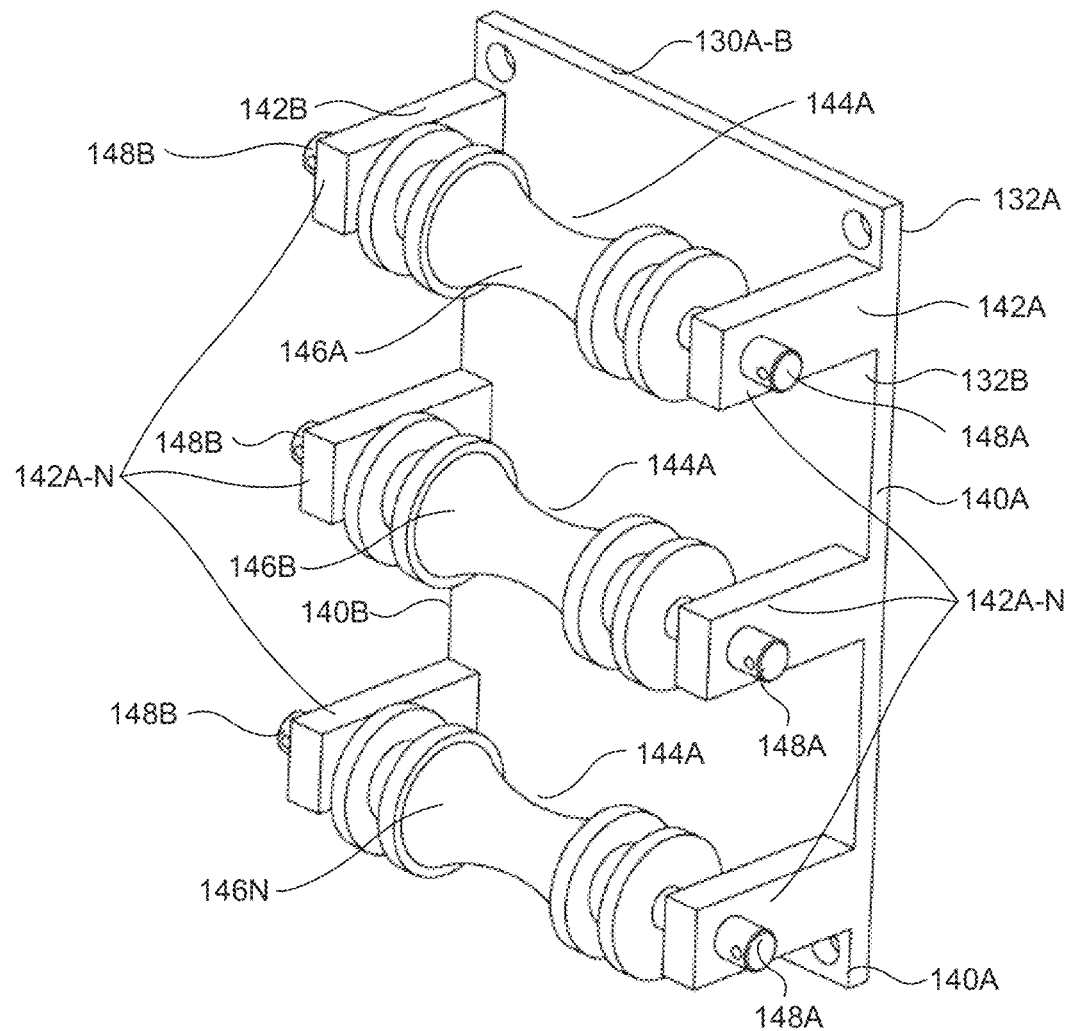
FIG. 4 depicts a perspective view of one of a first belt tensioner plate and a second belt tensioner plate comprising fingers which are adapted to accommodate with a stepped roller therebetween, in accordance with an embodiment of the present disclosure.
Figure 5:
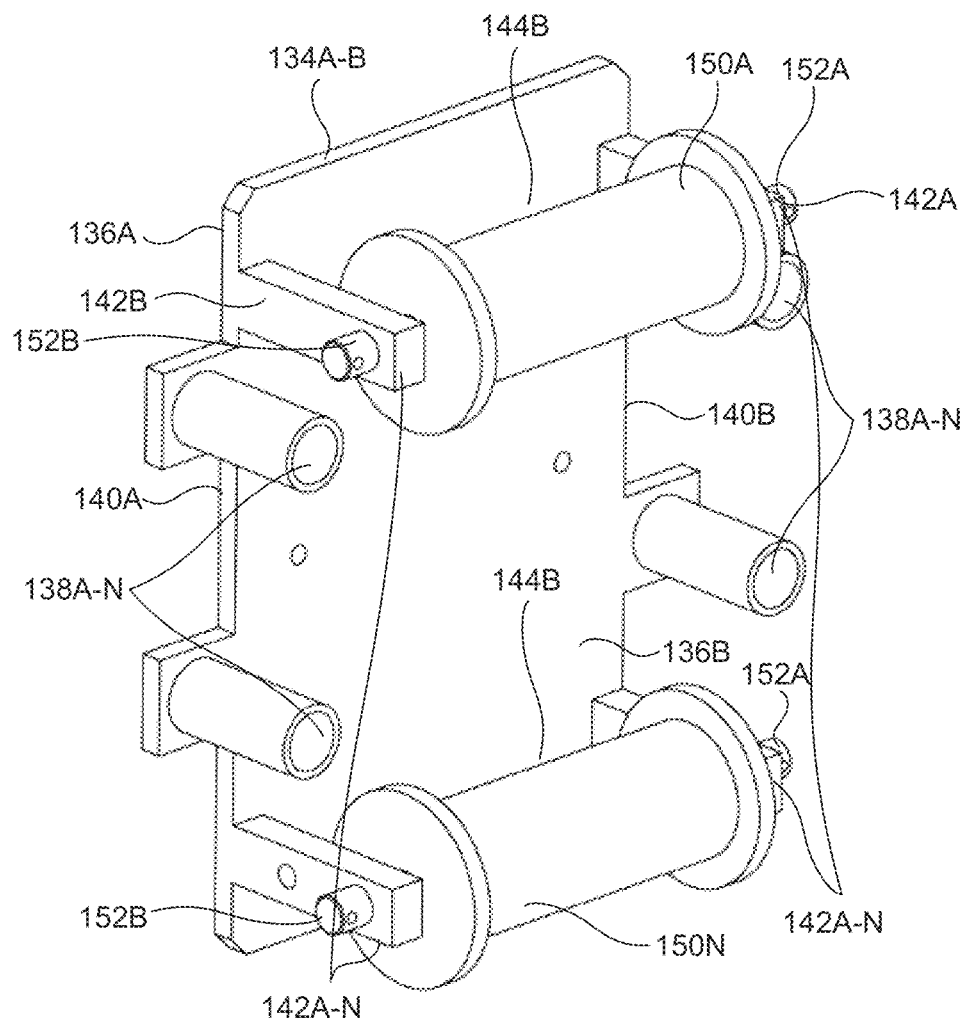
FIG. 5 depicts a perspective view of one of a third belt tensioner plate and a fourth belt tensioner plate comprising fingers which are adapted to accommodate with a dancing roller therebetween, in accordance with an embodiment of the present disclosure.

Further, each of the first belt tensioner plate 130A, the second belt tensioner plate 130A, the third belt tensioner plate 134A and the fourth belt tensioner plate 134A comprise a first side 140A and a second side 140B. Each of the first side and the second side of the first belt tensioner plate, the second belt tensioner plate, the third belt tensioner plate and the fourth belt tensioner plate comprise one or more set of fingers 142A-N. For instance, a finger set (top finger set) of FIG. 4 is referred as having a first finger 142A and a second finger 142B. In the present disclosure, the first finger 142A of a finger set from the one or more finger set 142A-N is positioned opposite to a second finger 142B of the finger set to form gap 144A and 144B, as shown in FIGS. 4 and 5 respectively. Each finger from the one or more set of fingers comprises a first end 146A and a second end 146B. The second end 146B of each of the finger from the finger set comprises a corresponding hole. This hole arrangement is like the hole arrangement comprised in each flange to accommodate a corresponding actuator. More specifically, FIG. 4, with reference to FIGS. 1A through 3, depicts a perspective view of one of the first belt tensioner plate and the second belt tensioner plate comprising fingers which are adapted to accommodate with a stepped roller therebetween, in accordance with an embodiment of the present disclosure. For instance, as depicted in FIG. 4, which illustrates one of the first belt tensioner plate and the second belt tensioner plate 130A-B, there are a plurality of stepped rollers 146A-N. Each of the plurality of stepped rollers 146A-N comprise a first end 148A and a second end 148B. Each corresponding stepped roller from the plurality of stepped rollers is adapted to fit in the gap 144A formed by the first finger and the second finger of the first belt tensioner plate 130A and the second belt tensioner plate 1306 such that the first end 148A and the second end 148B of each corresponding stepped roller passes through a corresponding hole of the first finger and the second finger. In other words, as depicted in FIG. 4, say stepped roller 146A from the plurality of stepped rollers 146A-N is adapted to fit in the gap 144A formed by the first finger 142A and the second finger 1426 of the first belt tensioner plate 130A and the second belt tensioner plate 1306 such that the first end 148A and the second end 148B of the stepped roller 146A passes through a corresponding hole of the first finger 142A and the second finger 142B respectively.

Like stepped rollers, the apparatus 100 comprises a plurality of dancing rollers 150A-N. Each dancing roller from the plurality of dancing roller 150A-N is adapted to be fitted in the gap 144B of the first finger 142A and the second finger 1426 of the third belt tensioner plate 134A and the fourth belt tensioner plate 134B such that a first end 152A and a second end 152B of each corresponding dancing roller passes through a corresponding hole of the first finger 142A and the second finger 142B. FIG. 5, with reference to FIGS. 1A through 4, depicts a perspective view of one of the third belt tensioner plate and the fourth belt tensioner plate comprising fingers which are adapted to accommodate with a dancing roller therebetween, in accordance with an embodiment of the present disclosure. In other words, as depicted in FIG. 5, say dancing roller 150A from the plurality of dancing rollers 150A-N is adapted to fit in the gap 144B formed by the first finger 142A and the second finger 1426 of the third belt tensioner plate 134A and the second belt tensioner plate 1346 such that the first end 152A and the second end 1526 of the dancing roller 150A passes through a corresponding hole of the first finger 142A and the second finger 142B respectively.

It is to be understood by a person having ordinary skill in the art or person skilled in the art that the above arrangement and configuration is explained for one finger set and roller type and such arrangement and configuration shall not be construed as limiting the scope of the present disclosure. Therefore, it is to be understood by a person having ordinary skill in the art or person skilled in the art that similar arrangement and configuration can be realized in practice for other finger sets and rollers (e.g., for both stepped rollers and dancing rollers) as depicted in FIGS. 4 and 5 respectively.

The apparatus 100 is further equipped with a plurality of pins, wherein each corresponding pin from the plurality of pins is adaptively coupled to (i) the first end 126A and the second end 126B of each corresponding actuated roller from the plurality of actuated rollers 124A-N, (ii) the first end 148A and the second end 148B of each corresponding stepped roller from the plurality of stepped rollers 146A-N and (iii) the first end 152A and the second end 152B of each corresponding actuated roller from the plurality of actuated rollers 150A-N. For instance, a roller (e.g., one of actuated roller, stepped roller, dancing roller and the like) having a first end and a second end, each of the first end and second end is coupled with a corresponding pin/fastener. Each of the plurality of stepped rollers 146A-N is in contact with an outer surface of the endless re-orienting belt 162, in one embodiment of the present disclosure. Each of the plurality of dancing rollers 150A-N and each of the plurality of actuated rollers 124A-N are in contact with an inner surface of the endless re-orienting belt 162, in one embodiment of the present disclosure.

The apparatus 100 further comprises a plurality of guiding rods 154A-N. The expression 'plurality of guiding rods may also be referred as 'guiding rods' or 'guide rods' and may be interchangeably used herein. Each guiding rod comprises a first end 156A and a second end 156B. The first end of a corresponding guiding rod from the plurality of guiding rods 154A-N is fixed to the first side and the second side of the at least one motor body 104, respectively. The second end of the corresponding guiding rod is coupled to a corresponding side of a corresponding guiding rod plate through a corresponding hole from the plurality of holes comprised on either side of each of the third belt tensioner plate 134A and the fourth belt tensioner plate 134B. For instance, the first end 156A of the corresponding guiding rod (e.g., say guiding rods 154A-N) is fixed to the first side and the second side of the at least one motor body 104 respectively as depicted in FIG. 1A. Similarly, the second end 156B of the corresponding guiding rod (e.g., say guiding rods 154A-N) is coupled to an inner surface (e.g., refer surface 160B) of a corresponding guiding rod plate 158B through a corresponding hole (e.g., say hole 138A) from the plurality of holes (138A-N) comprised on either side of each of the third belt tensioner plate 134A and the fourth belt tensioner plate 134B. In one embodiment as mentioned above, bushes may be fixed to each of the plurality of holes 138A-N, wherein each of the guiding rods 154A-N) pass through a corresponding bush and the corresponding hole of each of the third belt tensioner plate 134A and the fourth belt tensioner plate 134B. In other words, the bushes may be on the outer surface of the guiding rods to enable smooth movement of (i) the guiding rod plates 158A-B and (ii) the guiding rods 154A-N during the operation of the apparatus 100.

The apparatus 100 further comprises an endless re-orienting belt 162 that is held by the plurality of actuated rollers 124A-N, the plurality of stepped rollers 146A-N and the plurality of dancing rollers 150A-N. During operation of the apparatus, a profile (e.g., such as a metal component) is received on a region of the endless re-orienting belt 162 that is above the plurality of actuator arm assemblies 110A-N. In an embodiment, the profile is a non-circular object. In another embodiment, the profile is an object having at least one flat surface. In other words, the object is made up of materials and has parts wherein at least one side of the object consists of a flat surface. In an embodiment, the profile is a non-circular object having cross section same across the length of the profile. The profile is received (or placed) on the region of the endless re-orienting belt 162 above the plurality of actuator arm assemblies 110A-N in an initial orientation. Each of the plurality of actuator arm assemblies 110A-N are operated by a corresponding pinion gear coupled thereto which is operated by the corresponding motor from the one or more motors 106A-N such that the endless re-orienting belt 162 moves until the profile attains a desired orientation. In other words, rotary motion of the corresponding pinion gear triggers a sliding motion for each of the plurality of actuator arm assemblies 110A-N to move in the at least one of the first direction (up or down) and the second direction (up or down).

More specifically, each of the plurality of actuator arm assemblies 110A-N are operated by pinion gear, and actuated (using the one or more motors 106A-N) for movement in the at least one of the first direction (e.g., up or down direction) and the second direction until the profile shifts its position across sub-regions of the belt (e.g., a first sub-region formed by a first actuator arm assembly and a second actuator arm assembly to a second sub-region formed by the second actuator arm assembly and third second actuator arm assembly). In other words, the region herein may be referred to an entire belt region between the first actuator arm assembly (e.g., say actuator arm assembly 106A) and a last actuator arm assembly (e.g., say actuator arm assembly 106N). Sub-region herein may be referred to a specific portion of belt region that is formed between at least two adjacent actuator arm assemblies (e.g., a specific portion of the belt region between say the first actuator arm assembly 106A and a second actuator arm assembly 106B). Alternative example of the sub-region may be referred to a specific portion of belt region that is formed between a third actuator arm assembly 106C and a fourth actuator arm assembly 106D).

Figure 6A:
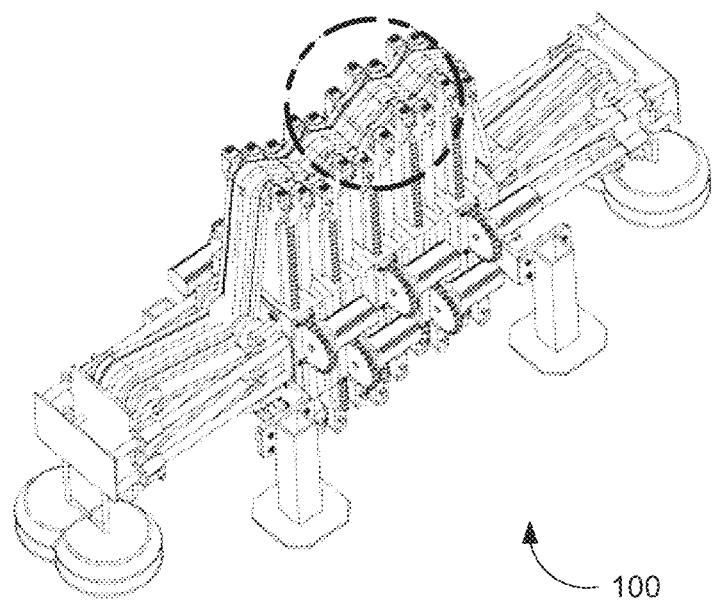
FIG. 6A depicts a perspective view of the profile re-orientation apparatus with sub-regions formed by a plurality of actuator arm assemblies therebetween, in accordance with an embodiment of the present disclosure.
Figure 6B:
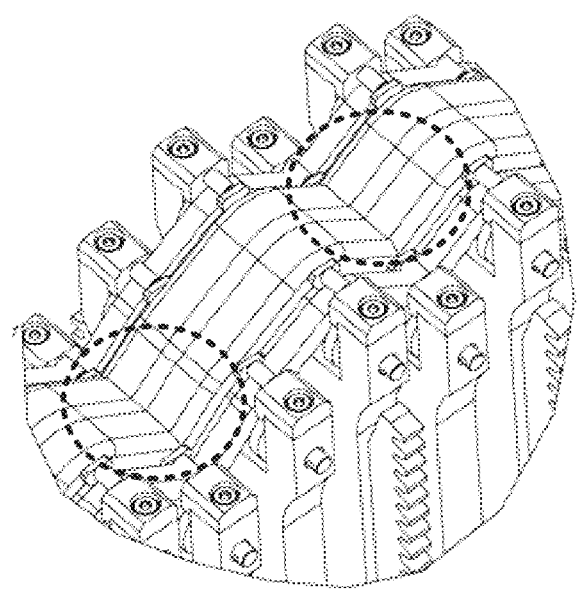
FIG. 6B depicts a perspective view of one or more sub-regions formed by the plurality of actuator arm assemblies of the profile re-orientation apparatus of FIG. 1A through 1D therebetween, in accordance with an embodiment of the present disclosure.

FIG. 6A, with reference to FIGS. 1A through 5, depicts a perspective view of the profile re-orientation apparatus 100 with sub-regions formed by the actuator arm assemblies 110A-N therebetween, in accordance with an embodiment of the present disclosure. Belt regions within dotted/dash line circle may be referred sub-regions, in one embodiment of the present disclosure. FIG. 6B, with reference to FIGS. 1A through 6B, depicts a perspective view of one or more sub-regions formed by the actuator arm assemblies 110A-N of the profile re-orientation apparatus 100 of FIGS. 1A through 1D therebetween, in accordance with an embodiment of the present disclosure. FIG. 6B depicts 2 sub-regions formed by corresponding pair of actuator arm assemblies, in one embodiment. The 2 sub-regions are depicted/represented by 2 dotted/dash line circle. During the operation of the apparatus 100, when each of the plurality of actuated rollers 124A-N moves in at least one direction, the third belt tensioner plate 134A and the fourth belt tensioner plate 134B are configured to (i) slide on the plurality of guiding rods 154A-N and (ii) adjust the endless re-orienting belt 162 to a desired tension.

It is to be understood by a person having ordinary skill in the art and person skilled in the art that instead of motor, pinion gear and rack assembly, the actuator arm assemblies 110A-N could be moved up/down by linear actuators, and shall examples shall not be construed as limiting the scope of the present disclosure.

The apparatus 100 further comprises a first belt tensioner 164A and a second belt tensioner 164B coupled to the third belt tensioner plate 134A, the fourth belt tensioner plate 134B and the corresponding guiding rod plate (158A, 158B). The third and fourth belt tensioner plates (134A-B) connect to a corresponding guiding rod plate (158A, 158B) via a wire 166 and a pulley mechanism 168. The first belt tensioner and the second belt tensioner are configured to adjust and balance tension of the endless re-orienting belt 162 for movement of the endless re-orienting belt 162 in at least one direction (e.g., forward, or backward direction). The first belt tensioner and the second belt tensioner are positioned between (i) the third belt tensioner plate 134A and the first guiding rod plate 158A and (ii) the fourth belt tensioner plate 134B and the second guiding rod plate 158B, respectively.

Figure 7A:
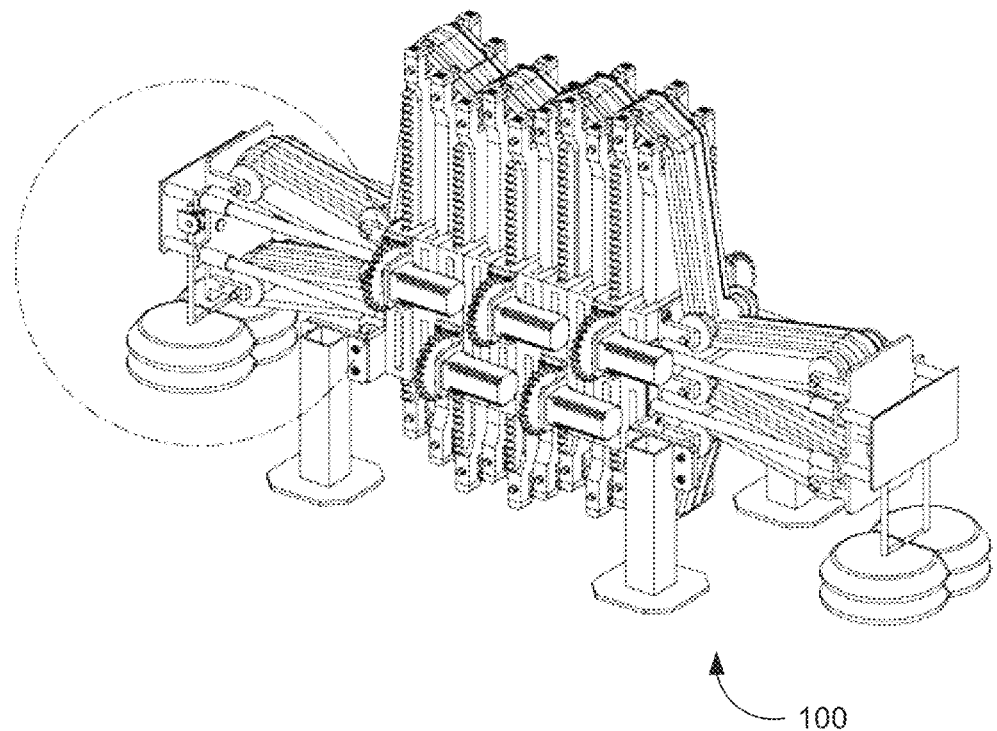
FIG. 7A illustrates a perspective view of the profile re-orientation apparatus of FIG. 1A through 1D that depicts a portion of a belt tensioner being positioned between a belt tensioner plate and a guiding rod plate, in accordance with an embodiment of the present disclosure.
Figure 7B:
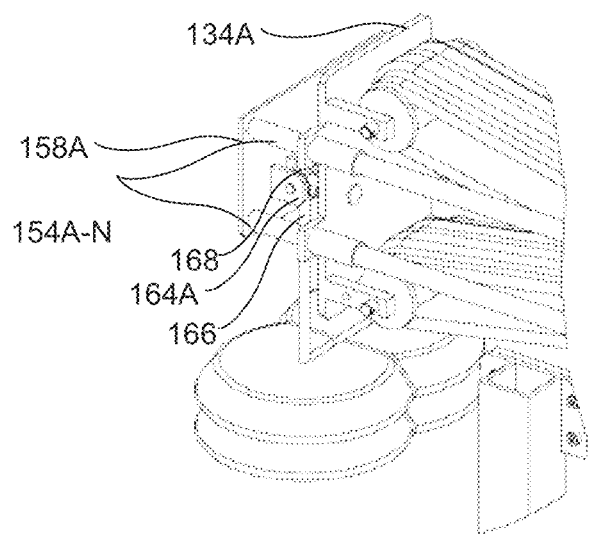
FIG. 7B depicts a first belt tensioner that is positioned between a third belt tensioner plate and the first guiding rod plate of the profile re-orientation apparatus of FIG. 1A through 1D, in accordance with an embodiment of the present disclosure.

FIG. 7A, with reference to FIGS. 1A through 6B, illustrates a perspective view of the profile re-orientation apparatus 100 of FIGS. 1A through 1D that depicts a portion of a belt tensioner being positioned between a belt tensioner plate and a guiding rod plate, in accordance with an embodiment of the present disclosure. FIG. 7B depicts the first belt tensioner 164A that is positioned between the third belt tensioner plate 134A and the first guiding rod plate 158A of the apparatus 100 of FIG. 1A through 1D, in accordance with an embodiment of the present disclosure, in one embodiment. Similarly, it is to be understood by a person having ordinary skill in the art and person skilled in the art that the second belt tensioner 164B is positioned between (i) the fourth belt tensioner plate 134B and the second guiding rod plate 158B, in accordance with an embodiment of the present disclosure.

Figure 8A:
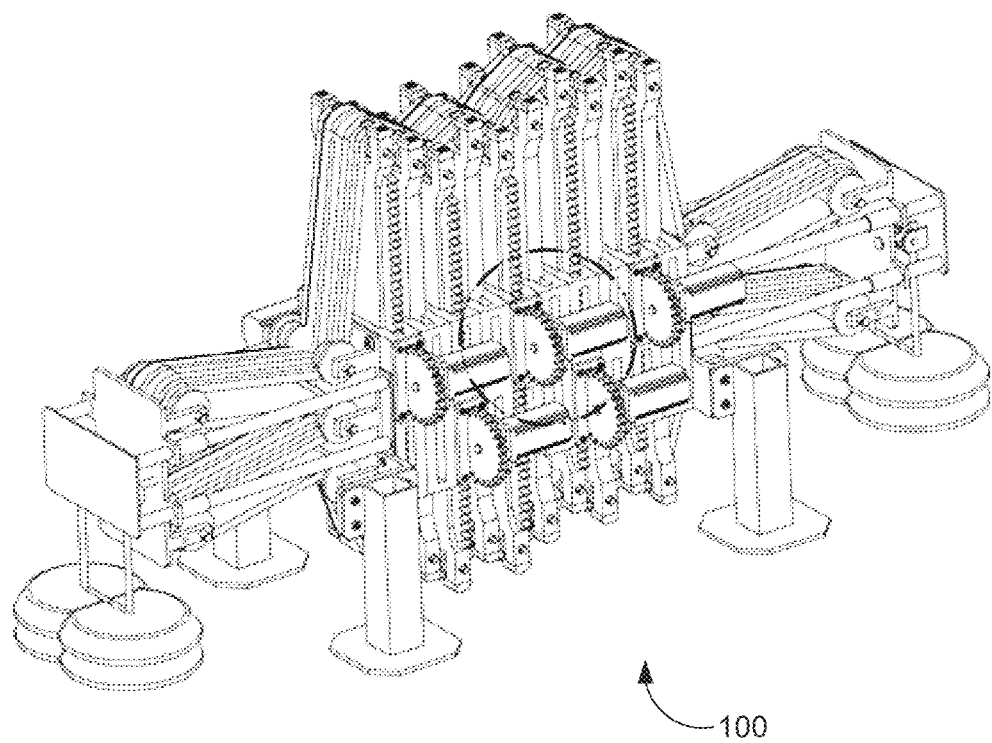
FIG. 8A illustrates a perspective view of the profile re-orientation apparatus of FIG. 1A through 1D that depicts a portion of pinion gear and motor arrangement, in accordance with an embodiment of the present disclosure.
Figure 8B:
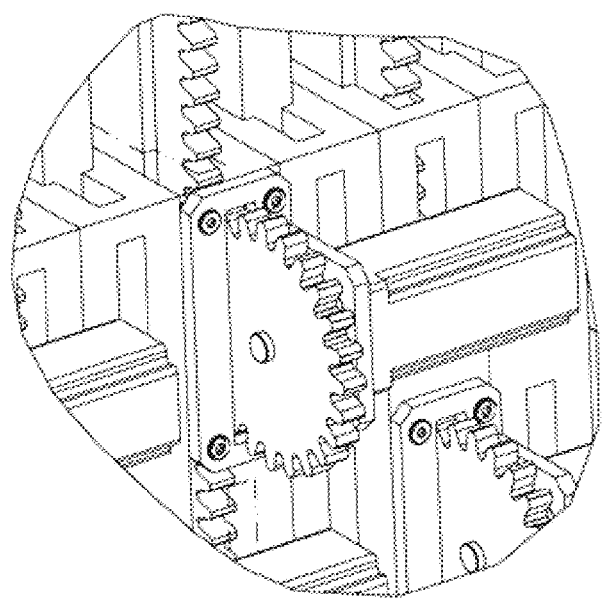
FIG. 8B depicts the portion of pinion gear and motor arrangement in the profile re-orientation apparatus of FIGS. 1A through 1D, in accordance with an embodiment of the present disclosure.

FIG. 8A, with reference to FIGS. 1A through 7B, illustrates a perspective view of the profile re-orientation apparatus 100 of FIGS. 1A through 1D that depicts a portion of pinion gear and motor arrangement, in accordance with an embodiment of the present disclosure. FIG. 8B, with reference to FIGS. 1A through 8A, depicts the portion of pinion gear and motor arrangement in the profile re-orientation apparatus 100, in accordance with an embodiment of the present disclosure.

The endless re-orienting belt 162 comprises a groove 172 on either side of, and along the length of the endless re-orienting belt 162. The endless re-orienting belt 162 further comprises a center area 174 (depicted/represented by dotted/dash line circle/eclipse in FIG. 9C), a first step arrangement 176A (depicted/represented by dotted/dash line based small circle in FIG. 9C) and a second step arrangement 176B (depicted/represented by dotted/dash line based small circle in FIG. 9C) joining a corresponding side of the center area 172, wherein the groove 170 is comprised in each of the first step arrangement 176A and the second step arrangement 176B comprise the groove 170.

Figure 9A:
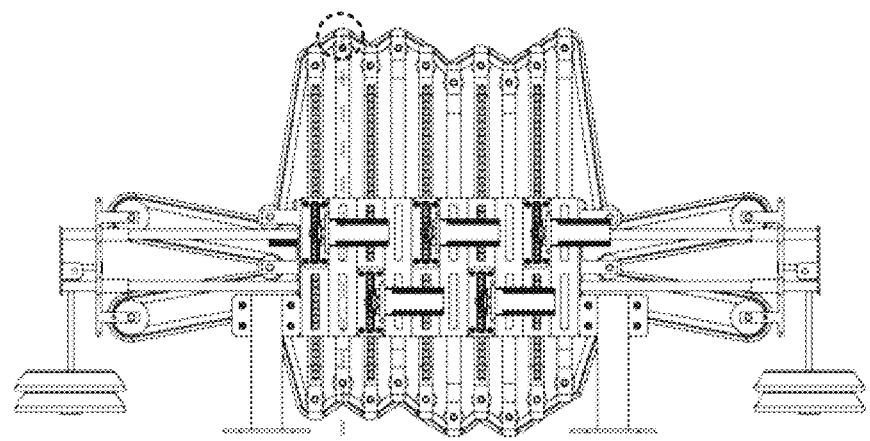
FIG. 9A depicts the front view of the apparatus with a portion in dotted/dash line circle illustrating a bearing roller arrangement and components of an endless re-orienting belt comprised in the profile re-orientation apparatus of FIGS. 1A through 1D, in accordance with an embodiment of the present disclosure.

The apparatus 100 further comprises a plurality of bearing rollers. In an embodiment, when the plurality of actuated rollers 124A-N are actuated, each of the plurality of bearing rollers 176A-N is configured to contact with the first step arrangement 174A and the second step arrangement 174B respectively to enable (i) an outer surface of the endless re-orienting belt 162 to be in constant contact with each of the plurality of bearing rollers 176A-N and (ii) a reduced friction between (a) each of the plurality of bearing rollers 176A-N and (b) the first step arrangement 174A and the second step arrangement 174B of the endless re-orienting belt 162. FIG. 9A, with reference to FIGS. 1A through 8B, depicts the front view of the apparatus with a portion in dotted/dash line circle illustrating a bearing roller arrangement and components of the endless re-orienting belt 162, in accordance with an embodiment of the present disclosure.

Figure 9B:
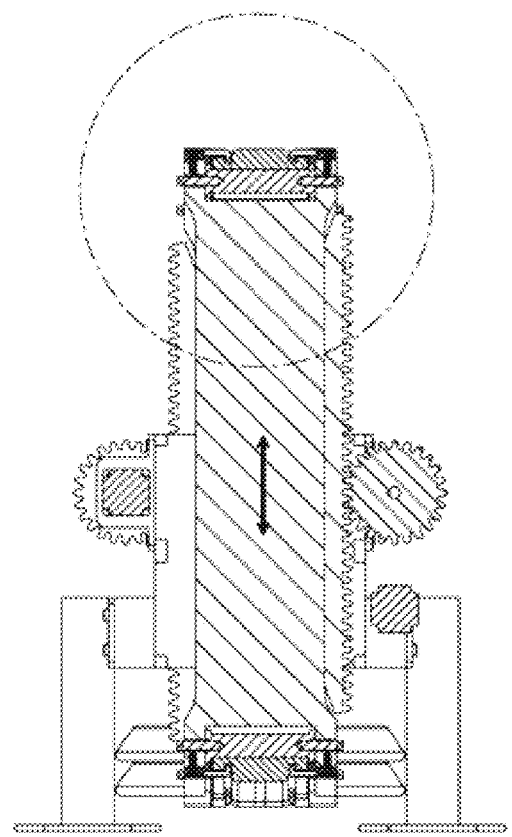
FIG. 9B depicts a cross sectional view of the profile re-orientation apparatus with a portion in dotted/dash line circle illustrating the bearing roller arrangement and the components of the endless re-orienting belt comprised in the profile re-orientation apparatus of FIGS. 1A through 1D, in accordance with an embodiment of the present disclosure.

FIG. 9B, with reference to FIGS. 1A through 9A, depicts a cross sectional view of the profile re-orientation apparatus 100 of FIGS. 1A through 1D with a portion in dotted/dash line circle illustrating the bearing roller arrangement and the components of the endless re-orienting belt 162 comprised in the profile re-orientation apparatus 100 of FIGS. 1A through 1D, in accordance with an embodiment of the present disclosure.

Figure 9C:
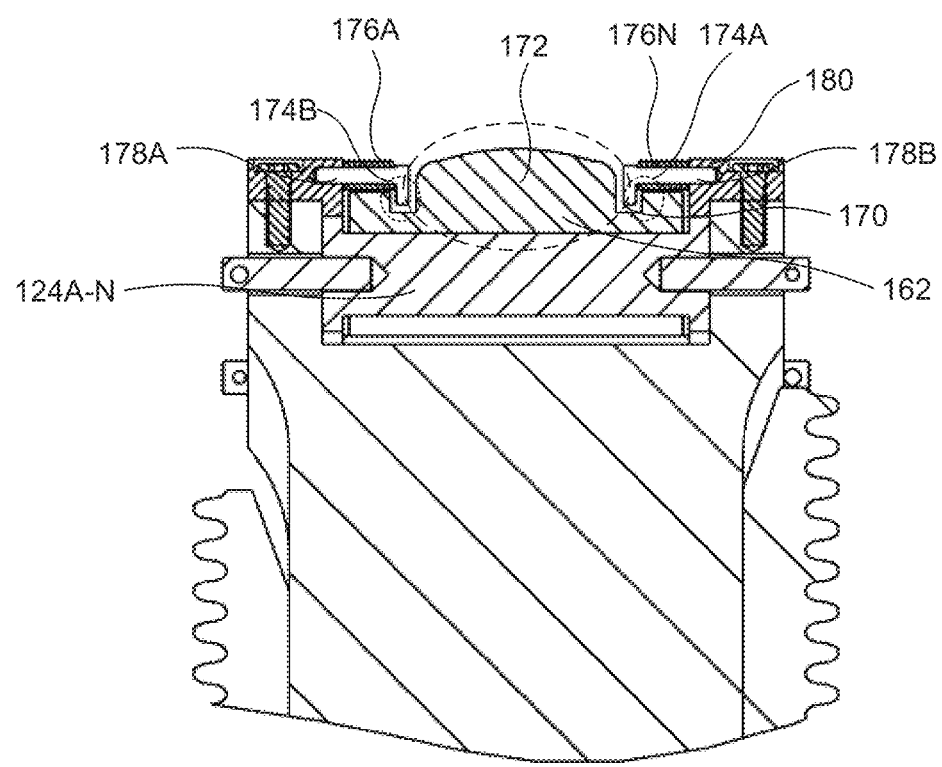
FIG. 9C depicts the portion in dotted/dash line circle illustrating bearing roller arrangement and components of the endless re-orienting belt comprised in the profile re-orientation apparatus of FIGS. 1A through 1D, in accordance with an embodiment of the present disclosure.

FIG. 9C, with reference to FIGS. 1A through 9B, depicts the portion in dotted/dash line circle illustrating bearing roller arrangement and components of the endless re-orienting belt 162 comprised in the profile re-orientation apparatus 100 of FIGS. 1A through 1D, in accordance with an embodiment of the present disclosure.

The apparatus 100 further comprises one or more belt retainers (or belt retainer elements 178A-B that are fixed on each end of each of the plurality of actuator arm assemblies 110A-N. The endless re-orienting belt 162 has special cross section, in which the endless re-orienting belt 162 has the groove 170 along the length of the endless re-orienting belt 162 which is retained by the belt retainer and at the same time enables the endless re-orienting belt 162 to freely slide over the bearing rollers 176A-N as it is moved in upward or downward direction. Each of the bearing rollers 176A-N revolves over the belt retainers accordingly.

The endless re-orienting belt 162 is positively fixed at top and bottom using a belt locker 180 at left and right side of each rack holder of each of the actuator arm assemblies 110A-N. The belt locker 180 consists of the belt retainer screwed to it and each of the belt retainers 178A-B consists of the bearing rollers 176A-N, wherein each of the bearing rollers 176A-B rolls over each of the belt retainers 178A-B to enable frictionless sliding for the endless re-orienting belt 162. The groove 170 is (positively) locked by the belt retainers 178A-B to prevent the endless re-orienting belt 162 from any slippage or loosening thereof, from the various rollers of the apparatus 100.

Further, the belt retainers 178A-B are designed in such a way that they are adapted/configured to restrict motion of the endless re-orienting belt 162 and only allow the endless re-orienting belt to move in at least one direction (e.g., forward or backward). Further, each of the belt retainers 178A-B is adapted/configured to connect to the groove 170 at each of the ends and restrict sideways motion of the endless re-orienting belt 162. Further, all the rollers of the apparatus are in constant contact (or always in contact) with the endless re-orienting belt 162 to provide support and enable smooth movement of the endless re-orienting belt 162.

The endless re-orienting belt 162 having the center area 172 is like a bulged concave surface positioned a level higher than a belt locker level to prevent the endless re-orienting belt 162 from sitting in or getting stuck between, or a belt locker mechanism (or belt locker) of the apparatus 100.

Figure 10A:
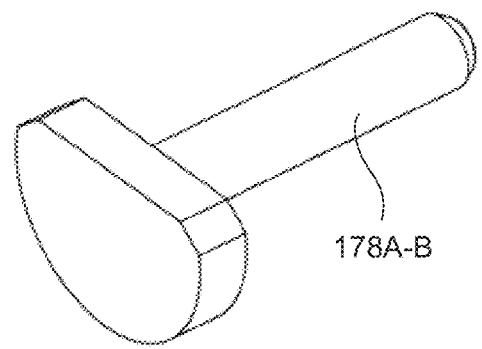
FIG. 10A depicts a belt retainer comprised in the profile re-orientation apparatus of FIGS. 1A through 1D, in accordance with an embodiment of the present disclosure.

FIG. 10A, with reference to FIGS. 1A through 9C, depicts a belt retainer comprised in the profile re-orientation apparatus 100 of FIGS. 1A through 1D, in accordance with an embodiment of the present disclosure.

Figure 10B:
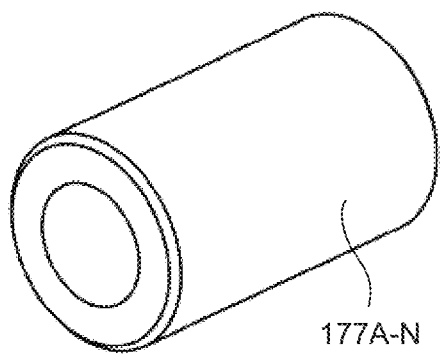
FIG. 10B depicts a bearing roller comprised in the profile re-orientation apparatus of FIGS. 1A through 1D, in accordance with an embodiment of the present disclosure.

FIG. 10B, with reference to FIGS. 1A through 10A, depicts a bearing roller comprised in the profile re-orientation apparatus 100 of FIGS. 1A through 1D, in accordance with an embodiment of the present disclosure.

Figure 10C:
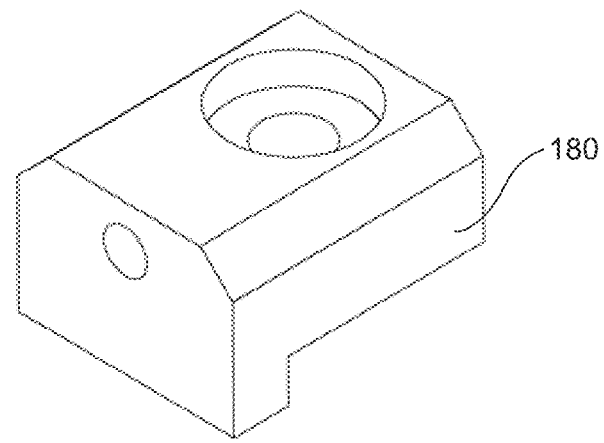
FIG. 10C depicts a belt locker mechanism comprised in the profile re-orientation apparatus of FIGS. 1A through 1D, in accordance with an embodiment of the present disclosure.

FIG. 10C, with reference to FIGS. 1A through 10B, depicts a belt locker mechanism comprised in the profile re-orientation apparatus 100 of FIGS. 1A through 1D, in accordance with an embodiment of the present disclosure.

Further, the apparatus 100 comprises dead weights that are held by the wire and pulley mechanism at each side of the apparatus as shown in FIGS. 1A through 1D. The dead weights are adapted/configured to enable balancing of tension being created in the endless re-orienting belt 162. One end of the wire (e.g., metallic wire) is attached to a corresponding third belt tensioner plate 134A and fourth belt tensioner plate 134B. Other end of the wire is attached/coupled to corresponding dead weight holding plate(s) at the bottom and passed over the pulley mechanism 168 mounted on the respective first guiding rod plate 158A and second guiding rod plate 158B. The pully mechanism 168 mounted on the respective first guiding rod plate 158A and second guiding rod plate 158B is adapted/configured to freely rotated and support the dead weights attached with the wire at one end.

If any of the actuated rollers 124A-N moves in at least one direction (e.g., say upward or downward direction) then the belt tensioner plates 134A and 134B are adapted/configured to slide on the guide rods 154A-N and adjust the required belt tension with help of dead weights attached to belt tensioner plates 134A-B via the wire. Since each of the third and fourth belt tensioner plates 134A and 134B has two dancing rollers 150A-N fixed to them the endless re-orienting belt 162 is passed over the rollers for maintaining the belt tension as it slides over the guide rods 154A-N.

Due to the motion of the actuator arm assemblies 110A-N, there is difference in tension in the endless re-orienting belt 162 being created wherein this is compensated by the back and forth movements of the third and fourth belt tensioner plate 134A-B and the dancing rollers 150A-N.

It is to be understood by a person having ordinary skill in the art and person skilled in the art that instead of dead weight arrangements, the apparatus 100 may also be equipped with spring loaded mechanism to maintain tensions in endless re-orienting belt 162. For such arrangements, tension springs can be incorporated between the first guiding rod plate 158A, the second guiding rod plate 158B, the third belt tensioner plate 134A and the fourth belt tensioner plate 134B respectively for maintaining tension in third belt tensioner plate 134A and the fourth belt tensioner plate 134B for the dancing rollers 150A-N. Spring in the spring loaded mechanism may be adapted/configured to expand or retract as and when each of the actuator arm assemblies 110A-N moves up and/or down.

Figure 11A:
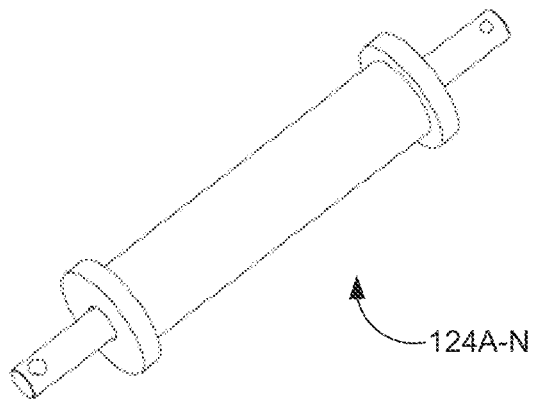
FIG. 11A, with reference to FIGS. 1A through 10C, depicts an actuated roller comprised in the profile re-orientation apparatus of FIGS. 1A through 1D, in accordance with an embodiment of the present disclosure.

FIG. 11A, with reference to FIGS. 1A through 10C, depicts an actuated roller comprised in the profile re-orientation apparatus 100 of FIGS. 1A through 1D, in accordance with an embodiment of the present disclosure.

Figure 11B:
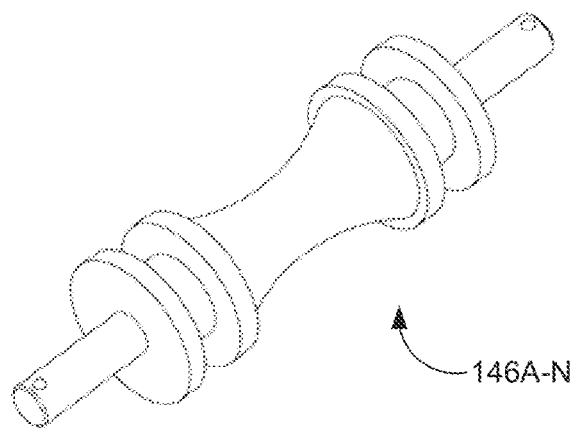
FIG. 11B, with reference to FIGS. 1A through 10C, depicts a stepped roller comprised in the profile re-orientation apparatus of FIGS. 1A through 1D, in accordance with an embodiment of the present disclosure.

FIG. 11B, with reference to FIGS. 1A through 10C, depicts a stepped roller comprised in the profile re-orientation apparatus 100 of FIGS. 1A through 1D, in accordance with an embodiment of the present disclosure.

Figure 11C:
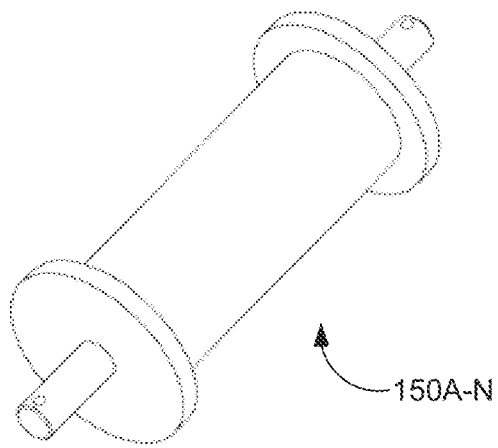
FIG. 11C, with reference to FIGS. 1A through 10C, depicts a dancing roller comprised in the profile re-orientation apparatus of FIGS. 1A through 1D, in accordance with an embodiment of the present disclosure.

FIG. 11C, with reference to FIGS. 1A through 10C, depicts a dancing roller comprised in the profile re-orientation apparatus of FIGS. 1A through 1D, in accordance with an embodiment of the present disclosure.

Figure 12A:
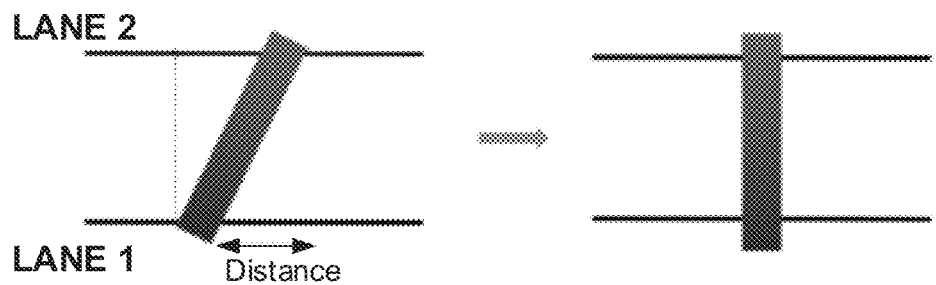
FIGS. 12A-12B depict a working example of the profile re-orientation apparatus 100 of FIGS. 1A through 1D, in accordance with an embodiment of the present disclosure.
Figure 12B:
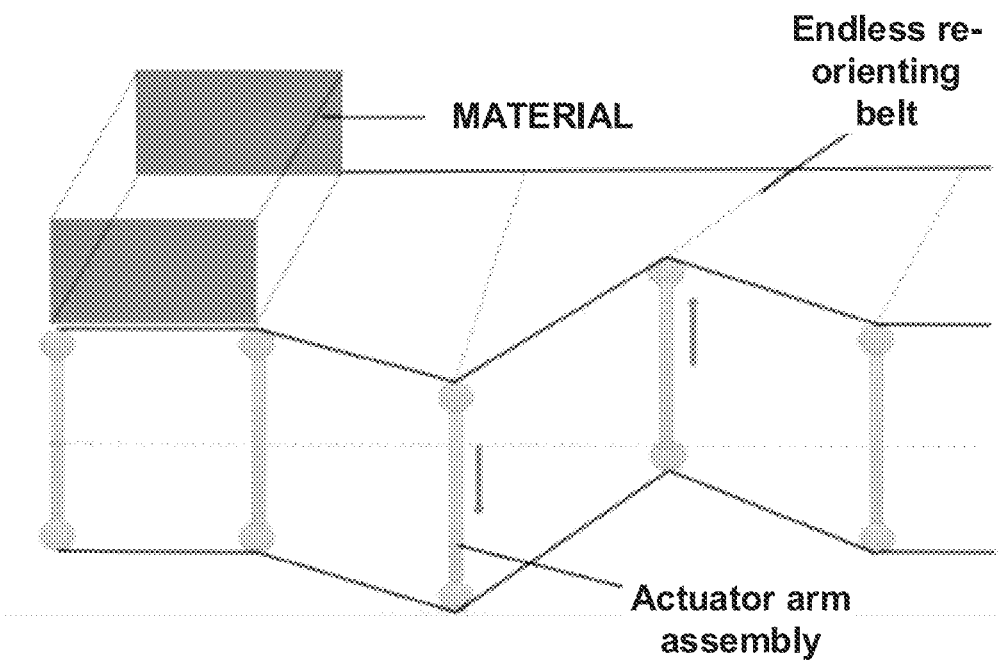

FIGS. 12A-12B, with reference to FIGS. 1A through 11C, depict a working example of the profile re-orientation apparatus 100 of FIGS. 1A through 1D, in accordance with an embodiment of the present disclosure. Before re-orientation, the profile (e.g., an extruded material) is first aligned perpendicular to the motion of the endless re-orienting belt 162 (also referred as re-orienting belt 162 or 'belt'). This may be achieved by using two or more re-orienters (e.g., also referred as 'two or more re-orienting mechanisms' or 'two or more profile re-orientation apparatus (or apparatus 100)' and may be interchangeably used herein) kept at the length of the extruded material. For example, as depicted in FIGS. 12A-12B, 2 mechanisms were installed at two ends (e.g., lane 1 and lane 2) upon which the profile to be re-oriented/align is kept/placed. Set of right actuator arm assemblies are raised/moved in upward direction so that the one end of profile on lane 2 is adapted to slide gradually and gets aligned, whereas actuator arm assembly from lane 1 is holding the other end of the profile or vice versa. Once the profile gets aligned then reorientation of profiles can begin. During reorientation of the profile, the selected set of actuator arm assemblies from both the lane/mechanism are adapted to slide up and down to change the orientation of profile.

Once the profile is raised beyond its Center of Gravity (CG) points, then due to CG shift, the profile is adapted or makes an attempt to shift its position from initial position to a next position/pose and then another set of actuator arm assemblies from both the lane/mechanism hold the profile from toppling thereby and retaining the orientation/position. This process is continued until the desired orientation is achieved.

After alignment and reorientation, the profile can be easily picked up by a gripper (such as a robotic gripper as known in the art) for grouping similar or identical profiles for next process. As described above, the re-orientation is performed by actuating one or more of the plurality of actuator arm assemblies 110A-N. Each of the plurality of actuator arm assemblies 110A-N moves to rotate the profile to desired pose and move/shift the profile to a desired position. Shifting/toppling of the profile is achieved (or happens) if the center of gravity of the profile is beyond the line perpendicular to a horizontal with respect to the pivot point as depicted in FIGS. 12A-12B.

Figure 13:
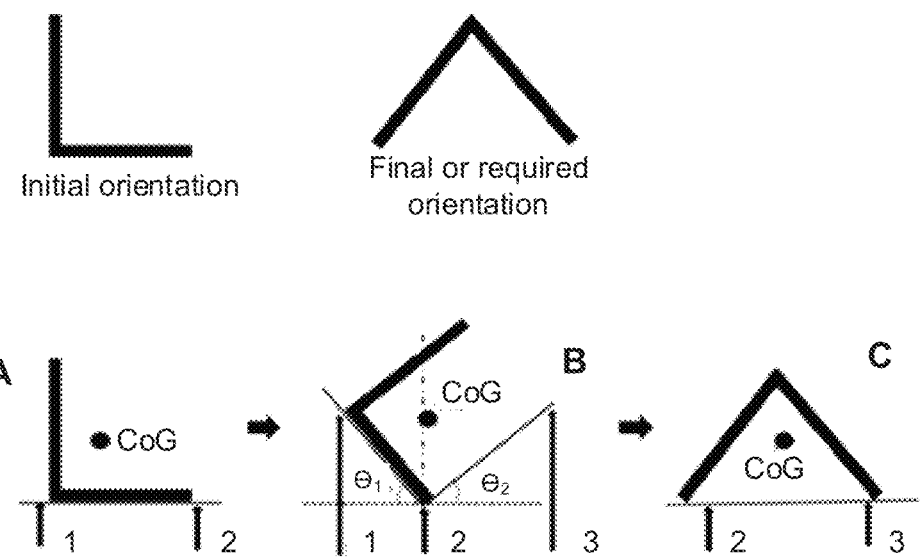
FIG. 13 depicts a method of re-orientation of a L-shaped profile/object using the profile re-orientation apparatus of FIGS. 1A through 1D, in accordance with an embodiment of the present disclosure.

FIG. 13, with reference to FIGS. 1A through 12B, depicts a method of re-orientation of a L-shaped profile/object using the profile re-orientation apparatus 100 of FIGS. 1A through 1D, in accordance with an embodiment of the present disclosure. Considering a L shaped object (50 mm×50 mm) that needs to be re-oriented. The first two figures at the top shows initial and required orientation of the profile. Reorienting process from below figures show re-orienting of the profile. An initial position of the profile is depicted in first stage of the below subset of figures depicted by 'A'. Next actuator 1 (e.g., first actuator arm assembly 110A) moves upward by angle theta1 thus lifting the profile to about actuator 2 (e.g., second actuator arm assembly 110B) and at the same time actuator 3 (e.g., third actuator arm assembly 110C) also moves upward creating the angle theta2 ensuring that the profile should not fall suddenly due to the shifting of Center of gravity (CoG) of profile from the vertical line about actuator 2, depicted by 'B'. Final/required orientation of the profile is achieved and depicted in representation 'C'.

Figure 14:
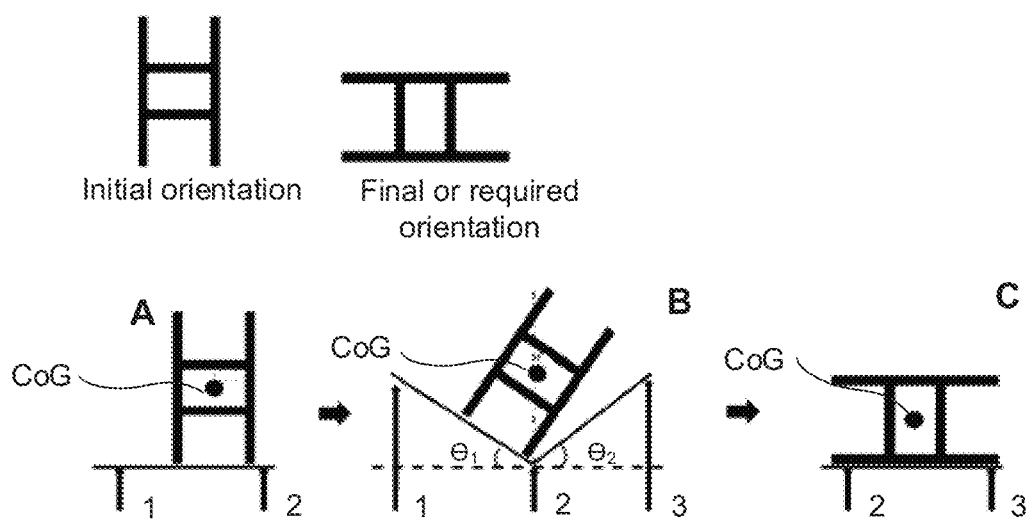
FIG. 14 depicts a method of re-orientation of a H-shaped profile/object using the profile re-orientation apparatus of FIGS. 1A through 1D, in accordance with an embodiment of the present disclosure.

FIG. 14, with reference to FIGS. 1A through 13, depicts a method of re-orientation of a H-shaped profile/object using the profile re-orientation apparatus 100 of FIGS. 1A through 1D, in accordance with an embodiment of the present disclosure. In FIG. 14, the first two figures show initial and required orientation of the profile. Reorienting process is depicted in representations A through C that show re-orienting of the profile. In representation 'A', the H-shaped profile is in an initial position, wherein in representation 'B' actuator 1 (e.g., first actuator arm assembly 110A) moves upward by angle theta1 thus by lifting the profile to about actuator 2 (e.g., second actuator arm assembly 110B) and at the same time actuator 3 (e.g., third actuator arm assembly 110D) also moves upward creating the angle theta2 thus ensuring that the profile does not fall suddenly due to the shifting of Center of gravity (CoG) of profile beyond the vertical line about actuator 2 (e.g., second actuator arm assembly 110B). Representation 'C' depicts final/required orientation of the profile being achieved. Angle theta2 between actuator 2 and 3 is created by the apparatus 100 to ensure safe landing of the profile on the belt—due to which sudden fall of the element is eliminated.

Figure 15:
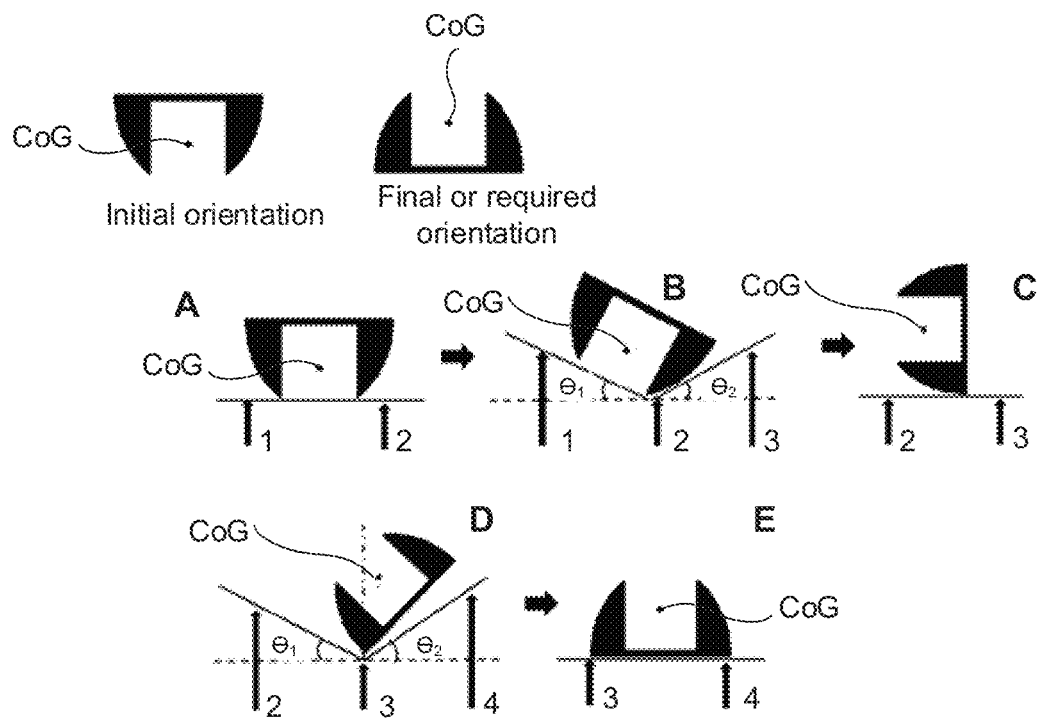
FIG. 15 depicts a method of re-orientation of a U-shaped profile/object with at least one side having a flat surface, using the profile re-orientation apparatus of FIGS. 1A through 1D, in accordance with an embodiment of the present disclosure.

FIG. 15, with reference to FIGS. 1A through 14, depicts a method of re-orientation of a U-shaped profile/object with at least one side having a flat surface, using the profile re-orientation apparatus 100 of FIGS. 1A through 1D, in accordance with an embodiment of the present disclosure. The first two figures show initial and required orientation of the profile. Reorienting process from image 1 to image 5 shows re-orienting of the U-shaped profile/object. In representation 'A', initial position of the U-shaped profile/object is shown. In representation 'B', actuator 1 (e.g., first actuator arm assembly 110A) moves upward by angle theta1 for lifting the profile to about actuator 2 (e.g., second actuator arm assembly 110A) and at the same time actuator 3 (e.g., third actuator arm assembly 110C) also moves upward creating the angle theta2 to ensure that the profile does not fall suddenly due to the shifting of Center of gravity (CoG) of profile beyond the vertical line with respect to actuator 2 (e.g., second actuator arm assembly 110B). Representation 'C' shows the intermediate stable orientation of profile. After that actuator 2 (e.g., second actuator arm assembly 110B) and actuator 4 (e.g., fourth actuator arm assembly 110D/N) moves upward creating an angle theta1 and theta2 respectively with respect to (or about) the actuator 3 (e.g., third actuator arm assembly 110C). Again, the actuator 4 (e.g., fourth actuator arm assembly 110D/N) ensures safe landing of the profile on belt portion of actuator 3 (e.g., third actuator arm assembly 110C) and 4 (e.g., fourth actuator arm assembly 110D/N). Representation 'E' shows the final/required orientation of the profile being achieved. Angle theta2 between actuator (e.g., third actuator arm assembly 110C) and 4 (e.g., fourth actuator arm assembly 110D/N) is created by the apparatus 100 to ensure the safe landing of the profile on the belt—due to which sudden fall of the element is eliminated.

Figure 16:
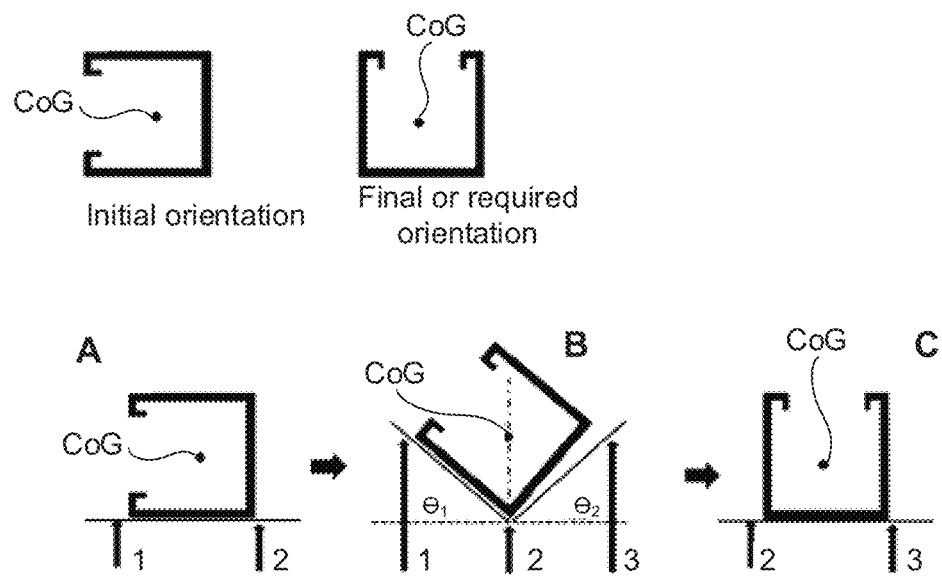
FIG. 16 depicts a method of re-orientation of another U-shaped profile/object with at least one side having a flat surface, using the profile re-orientation apparatus of FIGS. 1A through 1D, in accordance with an embodiment of the present disclosure.

FIG. 16, with reference to FIGS. 1A through 15, depicts a method of re-orientation of another U-shaped profile/ object with at least one side having a flat surface, using the profile re-orientation apparatus 100 of FIGS. 1A through 1D, in accordance with an embodiment of the present disclosure. In the example profile depicted in FIG. 16, the profile is first placed on the actuator arm assemblies 110A and 110B (as 1 and 2 respectively). In other words, the first two figure show initial and required orientation of the profile. Reorienting process from representation 'A' through 'C' show re-orienting of the profile. In representation 'A', initial position of the U-shaped profile is shown. In representation 'B', actuator 1 (e.g., first actuator arm assembly 110A) moves upward by angle theta1 and the profile is lifted to about actuator 2 (e.g., second actuator arm assembly 110B) and at the same time actuator 3 (e.g., third actuator arm assembly 110C) also moves upward creating the angle theta2 to ensure that the profile does not fall suddenly due to the shifting of Center of gravity (CoG) of profile beyond the vertical line about actuator 2 (e.g., second actuator arm assembly 110B). In representation 'C', final/required orientation of the profile being achieved is shown. The re-oriented profile may be then picked up (e.g., say by a robotic gripper).

Though the present disclosure describes implementation of the apparatus and its method for metal profiles as depicted in FIGS. 13 through 16, it is to be understood by a person having ordinary skill in the art or person skilled in the art that the apparatus 100 and its method can be implemented for any other profiles having at least one flat surface and such profiles should have same cross section along their length. Examples for other profiles, may include but are not limited to, objects such as cardboard/plastic/metal boxes (or cartons/crates), food packages (which are non-circular in shape and have same cross section across the length of the food package/crate), office supplies, bottles, tables, chairs, wooden planks, and the like. Such examples as described in the present disclosure shall not be construed as limiting the scope of the present disclosure and its embodiments of the apparatus 100 and method. The apparatus 100 may be programmed with a set of instructions for re-orientation of specific profiles. For instance, the apparatus 100 may be configured/programmed with say, instructions set 'A' for a specific profile type A. Similarly, the apparatus 100 may be configured/programmed with say, instructions set 'B' for a specific profile type B. For instance, the apparatus 100 may be configured/programmed with say, instructions set 'C' for a specific profile type C. It is to be understood by a person having ordinary skill in the art or person skilled in the art that appropriate instructions set may be invoked for execution by the apparatus 100 for performing profile re-orientation such that profile placed on endless-orientation belt in an initial position attains a desired orientation/position by way of actuating and moving corresponding actuator arm assemblies 110A-N. For executing the instructions set(s) as mentioned above, the apparatus 100 may comprise (or comprises) a system (not shown in FIGS) that includes a memory for storing instructions set(s), one or more input/output communication interfaces interface(s), one or more hardware processors. The one or more hardware processors are communicatively coupled to the memory via the one or more communication interfaces wherein the one or more hardware processors are configured by the instructions to execute and enable operation of each component of the apparatus 100 as described herein. More specifically, when a profile of specific shape and size is received on region/sub-regions of the endless re-orienting belt wherein the below surface of the endless re-orienting belt is in contact with the plurality of actuator arm assemblies 110A-N, one or more actuator arm assemblies from the plurality of actuator arm assemblies 110A-N are actuated based on instructions set being executed by the one or more hardware processors for movement of the one or more actuator arm assemblies in at least one direction (upward/downward direction) until the profile attains a desired final/required orientation/position. For instance, the instructions set A is invoked by the apparatus 100 wherein the instructions set A are executed by the one or more hardware processors to actuate one or more actuator arm assemblies from the plurality of actuator arm assemblies. For instance, when a profile type is detected as profile type A, the instructions set A is invoked by the apparatus 100 wherein the instructions set A is executed by the one or more hardware processors to actuate one or more actuator arm assemblies from the plurality of actuator arm assemblies 110A-N which move in at least one direction (upward/downward direction) until the profile type 'A' attains a desired orientation/position. For instance, when a profile type is detected as profile type B, the instructions set B is invoked by the apparatus 100 wherein the instructions set B is executed by the one or more hardware processors to actuate one or more actuator arm assemblies from the plurality of actuator arm assemblies 110A-N which move in at least one direction (upward/downward direction) until the profile type 'B' attains a desired orientation/position. It could be possible that instructions set A may also be used/invoked for execution if found/determined suitable for re-orientation of profile type 'B' or 'C'. Similarly, it could be possible that instructions set B may also be used/invoked for execution if found/determined suitable for re-orientation of profile type 'A' or 'C' and the like. The system may be mounted on the mounting stand 102, in one example embodiment of the present disclosure. The system may be housed on the apparatus 100, in another example embodiment of the present disclosure. The system may be comprised in the apparatus 100, in yet another example embodiment of the present disclosure. The system may be communicatively coupled to the apparatus 100 via one or more communication interfaces as applicable and known in the art, in yet further example embodiment of the present disclosure. In such scenarios where it is communicatively coupled to the apparatus 100, the apparatus 100 may be provisioned with options and configured with suitable arrangement such that the apparatus can be operated via the connected/communicatively coupled system.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An apparatus for re-orientation of one or more profiles, comprising:
 a mounting stand;
 at least one motor body that is fixed on the mounting stand, wherein the at least one motor body is configured to house one or more motors, wherein the at least one motor body comprises a plurality of slots, and wherein the plurality of slots are positioned adjacent to each other;
 a plurality of actuator arm assemblies, wherein each of the plurality of actuator arm assemblies comprises:
  a first end and a second end; and
  a rack holder, wherein the rack holder is positioned between the first end and the second end,
  wherein the rack holder is adapted to accommodate at least one rack gear,
  wherein each of the plurality of actuator arm assemblies is adapted to move in at least one of a first direction and a second direction based on a corresponding pinion gear coupled thereto, and being operated by a corresponding motor from the one or more motors,
  wherein each of the first end and the second end comprises a first flange and a second flange that (i) protrude outward from the first end and the second end and (ii) are separated by a distance forming a gap, wherein each of the first flange and the second flange comprise a corresponding hole, and
  wherein each of the plurality of actuator arm assemblies is adapted to fit in a corresponding slot from the plurality of slots;
 a plurality of actuated rollers, each of the plurality of actuated rollers comprises a first end and a second end, wherein each corresponding actuated roller from the plurality of actuated rollers is adapted to fit in the gap, and wherein the first end and the second end of each of the plurality of actuated rollers are adapted to be fitted through the corresponding hole of the first flange and the second flange respectively;
 a first belt tensioner plate and a second belt tensioner plate, wherein each of the first belt tensioner plate and the second belt tensioner plate comprise a first surface and a second surface, and wherein each of the first surface of each of the first belt tensioner plate and the second belt tensioner plate is coupled to a first side and a second side of the at least one motor body respectively;
 a third belt tensioner plate and a fourth belt tensioner plate having a first surface and a second surface, wherein the second surface of the third belt tensioner plate and the fourth belt tensioner plate is positioned opposite to the second surface of the first belt tensioner plate and the second belt tensioner plate respectively, and wherein each of the third belt tensioner plate and the fourth belt tensioner plate comprises a plurality of holes on either side therebetween,
 wherein each of the first belt tensioner plate, the second belt tensioner plate, the third belt tensioner plate and the fourth belt tensioner plate comprise a first side and a second side, wherein each of the first side and the second side of the first belt tensioner plate, the second belt tensioner plate, the third belt tensioner plate and the fourth belt tensioner plate comprise one or more set of fingers, and wherein a first finger of each finger set from the one or more finger set is positioned opposite to a second finger of the finger set to form a corresponding gap, each finger from the one or more fingers set comprises a first end and a second end, and wherein the second end comprises a corresponding hole;

a plurality of stepped rollers, each of the plurality of stepped rollers comprises a first end and a second end, wherein each corresponding stepped roller from the plurality of stepped rollers is adapted to be fitted in the corresponding gap formed by the first finger and the second finger of the first belt tensioner plate and the second belt tensioner plate such that the first end and the second end of each corresponding stepped roller passes through the corresponding hole of the first finger and the second finger;

a plurality of dancing rollers, wherein each dancing roller from the plurality of dancing roller is adapted to be fitted in the corresponding gap of the first finger and the second finger of the third belt tensioner plate and the fourth belt tensioner plate such that a first end and a second end of each corresponding dancing roller passes through the corresponding hole of the first finger and the second finger;

a plurality of guiding rods, wherein each guiding rod comprises a first end and a second end, wherein the first end of a corresponding guiding rod from the plurality of guiding rods is fixed to the first side and the second side of the at least one motor body respectively, and wherein the second end of the corresponding guiding rod is coupled to a corresponding side of a corresponding guiding rod plate through a corresponding hole from the plurality of holes comprised on either side of each of the third belt tensioner plate and the fourth belt tensioner plate; and an endless re-orienting belt that is held by the plurality of actuated rollers, the plurality of stepped rollers and the plurality of dancing rollers, wherein a profile is received on a region of the endless re-orienting belt that is above the plurality of actuator arm assemblies, in an initial orientation, and wherein each of the plurality of actuator arm assemblies move in the at least one of the first direction and the second direction based on the corresponding pinion gear coupled thereto, and are operated by the corresponding motor from the one or more motors such that the endless re-orienting belt moves until the profile attains a desired orientation.

2. The apparatus of claim 1, further comprising a groove on either side of the endless re-orienting belt, and along the length of the endless re-orienting belt.

3. The apparatus of claim 1, further comprising a first belt tensioner and a second belt tensioner coupled to the third belt tensioner plate, the fourth belt tensioner plate and the corresponding guiding rod plate via a wire and a pulley mechanism, wherein the first belt tensioner and the second belt tensioner are configured to adjust and balance tension of the endless re-orienting belt for movement of the endless re-orienting belt in at least one direction.

4. The apparatus of claim 1, further comprising a plurality of pins, wherein each of the plurality of pin is adaptively coupled to (i) the first end and the second end of each corresponding actuated roller from the plurality of actuated rollers, (ii) the first end and the second end of each corresponding stepped roller from the plurality of stepped rollers and (iii) the first end and the second end of each corresponding actuated roller from the plurality of actuated rollers.

5. The apparatus of claim 1, wherein when each of the plurality of actuated rollers moves in at least one direction, the third belt tensioner plate and the fourth belt tensioner plate are configured to (i) slide on the plurality of guiding rods and (ii) adjust the endless re-orienting belt to a desired tension.

6. The apparatus of claim 1, wherein rotary motion of the corresponding pinion gear triggers a sliding motion for each of the plurality of actuator arm assemblies to move in the at least one of the first direction and the second direction.

7. The apparatus of claim 2, wherein the endless re-orienting belt comprises:
a center area; and
a first step arrangement and a second step arrangement joining a corresponding side of the center area, wherein each of the first step arrangement and the second step arrangement comprise the groove.

8. The apparatus of claim 7, further comprising a plurality of bearing rollers, wherein when one or more of the plurality of actuated rollers are actuated, each of the plurality of bearing rollers is configured to contact with the first step arrangement and the second step arrangement respectively to enable:
(i) an outer surface of the endless re-orienting belt to be in constant contact with each of the plurality of bearing rollers, and
(ii) a reduced friction between (a) each of the plurality of bearing rollers and (b) the first step arrangement and the second step arrangement of the endless re-orienting belt.

9. The apparatus of claim 1, wherein each of the plurality of stepped rollers is in contact with an outer surface of the endless re-orienting belt, and wherein each of the plurality of dancing rollers and each of the plurality of actuated rollers are in contact with an inner surface of the endless re-orienting belt.

10. The apparatus of claim 1, wherein the profile is a non-circular object.

11. The apparatus of claim 1, wherein the profile is an object comprising at least one side with a flat surface.

12. The apparatus of claim 1, wherein the profile is a non-circular object having cross section same across the length of the profile.

* * * * *